(12) United States Patent
Bar

(10) Patent No.: US 10,957,081 B2
(45) Date of Patent: Mar. 23, 2021

(54) DYNAMIC AND COOPERATIVE GRAPH CREATION

(71) Applicant: Karta Hub Ltd., Ramat-HaSharon (IL)

(72) Inventor: Tzachi Bar, Ramat-HaSharon (IL)

(73) Assignee: Karta Hub, Ramat Hastiaron (IL)

( * ) Notice: Subject to any disclaimer, the term of this patent is extended or adjusted under 35 U.S.C. 154(b) by 0 days.

(21) Appl. No.: 16/608,884

(22) PCT Filed: Apr. 27, 2017

(86) PCT No.: PCT/IL2017/050477
§ 371 (c)(1),
(2) Date: Oct. 28, 2019

(87) PCT Pub. No.: WO2018/198105
PCT Pub. Date: Nov. 1, 2018

(65) Prior Publication Data
US 2020/0193659 A1 Jun. 18, 2020

(51) Int. Cl.
G06T 11/20 (2006.01)
G06F 16/901 (2019.01)
G06F 40/30 (2020.01)

(52) U.S. Cl.
CPC ........ G06T 11/206 (2013.01); G06F 16/9024 (2019.01); G06F 40/30 (2020.01); *G06T 2200/24* (2013.01)

(58) Field of Classification Search
CPC ... G06T 11/206; G06T 2200/24; G06F 40/30; G06F 16/9024

(Continued)

(56) References Cited

U.S. PATENT DOCUMENTS 9,176,639 B1 11/2015 Barros et al.
10,373,525 B2 * 8/2019 Dhoolia .................. G09B 23/02
(Continued)

FOREIGN PATENT DOCUMENTS

WO WO 2018/198105 11/2018

OTHER PUBLICATIONS

International Preliminary Report on Patentability dated Jul. 7, 2019 From the International Bureau of WIPO Re. Application No. PCT/IL2017/050477. (7 Pages).

(Continued)

*Primary Examiner* — Jacinta M Crawford

(57) ABSTRACT

A computer implemented method of assessing sub-graphs proposed for constructing a concept map, comprising using one or more processors for executing code for receiving a proposed sub-graph from one or more user client terminals used by users, where the proposed sub-graph comprises concept nodes and edges defining conceptual relationship between the concept nodes and searching a database comprising stored sub-graphs to determine a match of the proposed sub-graph with one of the stored sub-graphs each associated with a stored feedback record. In case of a match, selecting the stored feedback record associated with a matching stored sub-graph and in case of no-match, forwarding the proposed sub-graph to a reviewer client terminal of reviewer(s) and receiving from the reviewer client terminal(s) a generated feedback record and responding to the user client terminal(s) with the selected stored feedback record or the generated feedback record according to the match.

20 Claims, 15 Drawing Sheets

(58) Field of Classification Search
USPC .......................................................... 345/440
See application file for complete search history.

(56) References Cited

U.S. PATENT DOCUMENTS

| 2002/0073059 | A1* | 6/2002 | Foster ..................... G06F 16/25 |
| 2008/0001948 | A1* | 1/2008 | Hirsch .................... G06T 11/20 |
| | | | 345/440 |
| 2010/0287163 | A1* | 11/2010 | Sridhar ................. G06Q 30/02 |
| | | | 707/740 |

OTHER PUBLICATIONS

International Search Report and the Written Opinion dated Jul. 27, 2017 From the International Searching Authority Re. Application No. PCT/IL2017/050477. (9 Pages).

* cited by examiner

DYNAMIC AND COOPERATIVE GRAPH CREATION

RELATED APPLICATIONS

This application is a National Phase of PCT Patent Application No. PCT/IL2017/050477 having International filing date of Apr. 27, 2017 and the contents of which are all incorporated by reference as if fully set forth herein in its entirety.

FIELD AND BACKGROUND OF THE INVENTION

The present invention, in some embodiments thereof, relates to assessing sub-graphs proposed for constructing a concept map graph and, more particularly, but not exclusively, to assessing sub-graphs proposed for constructing a concept map graph by applying automated assessment.

The use of concept maps in a plurality of fields, in particular education is constantly growing as part of the ever going progress in learning, teaching, and tutoring methodologies.

A concept map is a graphical tool that may be used for visualizing concepts and relationships among the presented concepts. The concept map may typically be associated with a specific topic, knowledge domain, a subject, a process, a system and/or the like. The concepts may include, for example, ideas, entities, objects, processes, actions and/or the like which may be expressed through sematic representations, for example, a word, a phrase, a sentence, a picture, a video, a sound track and/or the like.

The concept map may typically be presented as a graph comprising a plurality of concept nodes each associated with a concept and one or more edges connecting two or more nodes which represent suggested relationships between the connected concept nodes.

SUMMARY OF THE INVENTION

According to a first aspect of the present invention there is provided a computer implemented method of assessing sub-graphs proposed for constructing a concept map, comprising using one or more processor for executing a code for:
  Receiving a proposed sub-graph from one or more of a plurality of user client terminals used by a plurality of users. The proposed sub-graph for constructing a concept map graph comprises a plurality of concept nodes and one or more edge defining a conceptual relationship between the concept nodes.
  Searching a database comprising a plurality of stored sub-graphs to determine a match of the proposed sub-graph with one of the plurality of stored sub-graphs. Each of the plurality of stored sub-graphs is associated with a stored feedback record.
  In case of a match, selecting the stored feedback record associated with a matching stored sub-graph.
  In case of no-match, forwarding the proposed sub-graph to a reviewer client terminal of one or more reviewers and receiving from the one or more reviewer client terminals a generated feedback record for the proposed sub-graph.
  Responding to the one or more user client terminals with the selected stored feedback record or the generated feedback record according to the match.

By automating the proposed sub-graph assessment process, a significantly larger number of proposed sub-graphs submitted by a large number of users may be reviewed and/or assessed during a single concept map graph construction session. Moreover, combining the automated assessment with an assessment generated by the reviewer(s) may significantly improve the conducted session as well as it may benefit future sessions of concept map graph construction. Furthermore, by forwarding at least some of the sub-graphs to the reviewer(s) even in case of a match event, the feedback for one or more of the sub-graphs may be improved, enhanced and/or become more comprehensive.

According to a second aspect of the present invention there is provided a system for assessing sub-graphs proposed for constructing a concept map, comprising one or more processors adapted to execute a code, the code comprising:
  Code instructions to receive a proposed sub-graph from one or more of a plurality of user client terminals used by a plurality of users. The proposed sub-graph for constructing a concept map graph comprises a plurality of concept nodes and one or more edge defining a conceptual relationship between the concept nodes.
  Code instructions to search a database comprising a plurality of stored sub-graphs to determine a match of the proposed sub-graph with one of the plurality of stored sub-graphs. Each of the plurality of stored sub-graphs is associated with a stored feedback record.
  Code instructions to select, in case of a match, the stored feedback record associated with a matching stored sub-graph.
  Code instructions to forward, in case of no-match, the proposed sub-graph to a reviewer client terminal of one or more reviewers and receive from the one or more reviewer client terminals a generated feedback record for the proposed sub-graph.
  Code instructions to respond to the one or more user client terminals with the selected stored feedback record or the generated feedback record according to the match.

According to a third aspect of the present invention there is provided a computer program product for assessing sub-graphs proposed for constructing a concept map, comprising:
  A non-transitory computer readable storage medium.
  First program instructions for receiving a proposed sub-graph from one or more of a plurality of user client terminals used by a plurality of users. The proposed sub-graph for constructing a concept map graph comprises a plurality of concept nodes and one or more edge defining a conceptual relationship between the concept nodes.
  Second program instructions for searching a database comprising a plurality of stored sub-graphs to determine a match of the proposed sub-graph with one of the plurality of stored sub-graphs, each of the plurality of stored sub-graphs is associated with a stored feedback record.
  Third program instructions for selecting the stored feedback record associated with a matching stored sub-graph in case of a match.
  Fourth program instructions for forwarding the proposed sub-graph to a reviewer client terminal of one or more reviewer in case of no-match and receiving from the one or more reviewer client terminal a generated feedback record for the proposed sub-graph.
  Fifth program instructions for responding to the one or more user client terminal with the selected stored feedback record or the generated feedback record according to the match.

Wherein the first, second, third, fourth and fifth program instructions are executed by one or more processors from the non-transitory computer readable storage medium.

With reference to the first, the second and/or the third aspects of the invention, according to a first implementation, the concept map graph is a member of a group consisting of: a directed graph and an undirected graph. This may allow construction, assessment and/or review session for types of various concept map graphs.

With reference to the first, the second and/or the third aspects of the invention and/or the first implementation, according to a second implementation, one or more of the plurality of nodes is an existing concept node presented in the constructed concept map graph. This may allow the user(s) to have a starting point for the proposed sub-graph, a hint, a suggest solution path and/or the like.

Optionally, with reference to the first, the second and/or the third aspects of the invention and/or any of the previous implementations, according to a third implementation, the proposed sub-graph is analyzed using one or more semantic analysis tool to estimate a match probability of the matching stored sub-graph which is semantically similar to the proposed sub-graph. Using the automated semantic tools may further reduce the workload from the reviewer(s) and may allow accommodating more users in the session.

With reference to the first, the second and/or the third aspects of the invention and/or any of the previous implementations, according to a fourth implementation, the feedback record indicates an assessment level of the sub-graph and comprises one or more member of a group consisting of: a score, a template phrase and free text. This may allow providing the user with feedback types that may be selected to suit the proposed sub-graph with more or less detail as required and/or determined by the reviewer(s).

Optionally, with reference to the first, the second and/or the third aspects of the invention and/or any of the previous implementations, according to a fifth implementation, a plurality of proposed sub-graphs such as the proposed sub-graph received from at least some of the plurality client terminals are aggregated to update the concept map graph to include an aggregated sub-graph. This may allow multiple users to for collaborate in constructing the concept map graph.

Optionally, with reference to the first, the second and/or the third aspects of the invention and/or any of the previous implementations, according to a sixth implementation, the database is updated to include the proposed sub-graph associated with the generated feedback record received from the one or more reviewer client terminal. Updating the database may enhance the database with additional feedback for the stored sub-graphs. This enhanced database may present a higher rate of matches in future session(s).

Optionally, with reference to the first, the second and/or the third aspects of the invention and/or any of the previous implementations, according to a seventh implementation, the proposed sub-graph is forwarded to one or more of the reviewer client terminals in case of the match when a consensus value of the selected stored feedback record does not exceed a pre-defined feedback uniformity threshold. The consensus value is calculated by aggregating a plurality of feedback entries in the selected stored feedback record which are previously generated by a plurality of reviewers for the matching stored sub-graph. Defining the consensus level may allow the reviewer(s) flexibility in assessing the proposed sub-graphs by defining they wish to review personally proposed sub-graphs having non-conclusive feedback.

Optionally, with reference to the first, the second and/or the third aspects of the invention and/or the seventh implementation, according to an eighth implementation, the proposed sub-graph is forwarded to one or more of the reviewer client terminals in case of the match when the consensus value of the selected stored feedback record exceeds the pre-defined feedback uniformity threshold and a number of the plurality of previous feedback entries does not exceeds a pre-defined feedback number threshold. Defining the minimum number of feedback entries available for the matching stored sub-graph may allow the reviewer(s) further control over which proposed sub-graphs to review personally, i.e. those proposed sub-graphs the reviewer(s) deem have insufficient feedback entries.

Optionally, with reference to the first, the second and/or the third aspects of the invention and/or the seventh implementation, according to a tenth implementation, the proposed sub-graph is forwarded to one or more of the reviewer client terminals in case of the match when the consensus value of the stored feedback record exceeds the pre-defined feedback uniformity for a partial set of the proposed sub-graph. This may allow the reviewer(s) more flexibility in defining which proposed sub-graphs they wish to evaluate personally, i.e. those proposed sub-graphs which may be partially correct.

Optionally, with reference to the first, the second and/or the third aspects of the invention and/or the seventh implementation, according to an eleventh implementation, a weight is assigned to each feedback entry in each of the plurality of stored feedback records according to one or more attributes of the reviewer who generated the each feedback record, the weight is used for the consensus value calculation, the one or more attribute is a member of a group consisting of: a seniority of the reviewer, an experience of the reviewer and a rating of the reviewer. The weights may allow giving each feedback entry more or less significance and/or value according to its weight.

Optionally, with reference to the first, the second and/or the third aspects of the invention and/or any of the previous implementations, according to a twelfth implementation, an automation threshold is set to control forwarding the proposed sub-graph to the one or more reviewer client terminal in case of the match such that the proposed sub-graph is forwarded to the one or more reviewers when an estimated automation level exceeds the automation threshold. The estimated automation level represents an expected ratio of match events in which the matching stored sub-graph is found to match the proposed sub-graph. This may allow adjusting the reviewer(s) workload to estimated workload.

With reference to the first, the second and/or the third aspects of the invention and/or the twelfth implementation, according to a thirteenth implementation, the estimated automation level is estimated by calculating the match events for one or more of:

A group of recently proposed sub-graphs proposed during a current session of the concept map graph construction.

A group of proposed sub-graphs proposed during one or more previous session of the concept map graph construction.

A group of proposed sub-graphs proposed for a one or more similar concept map graph.

Basing the calculation for the estimated workload on one or more sessions and/or part of them may provide increased accuracy estimation.

Optionally, with reference to the first, the second and/or the third aspects of the invention and/or any of the previous implementations, according to a fourteenth implementation, an estimated workload of one or more of the reviewers is compared to a desired workload of the one or more reviewers to control forwarding the proposed sub-graph to the one or more reviewer client terminals in case of the match such that the proposed sub-graph is forwarded to the one or more reviewer client terminals when the desired workload exceeds the estimated workload. This may allow the reviewer(s) to define their own preferences in terms of workload.

Optionally, with reference to the first, the second and/or the third aspects of the invention and/or the fourteenth implementation, according to a fifteenth implementation, the proposed sub-graph is forwarded to the one or more reviewer client terminals in case of the match when a stored feedback record for said matching stored sub-graph is incomplete. This may allow enhancing incomplete feedback records available in the database.

Optionally, with reference to the first, the second and/or the third aspects of the invention and/or any of the previous implementations, according to a sixteenth implementation, the proposed sub-graph is forwarded to one or more other user client terminal. User feedback record generated for the proposed sub-graph by one or more of the users using the user client terminal are received and transferred to the one or more reviewer client terminals for validation. This may allow other users (not reviewers) to review and/or asses the proposed sub-graph(s) submitted by other users. However, in order to verify the generated user feedback is correct it may first be validated by one or more reviewers.

Optionally, with reference to the first, the second and/or the third aspects of the invention and/or the sixteenth implementation, according to a seventeenth implementation, the database is updated to include the user feedback record associated with the user feedback record in case a validation message for the user feedback record is received from the one or more reviewer client terminal. This allows enhancing the database with validated user generated feedback records.

Optionally, with reference to the first, the second and/or the third aspects of the invention and/or the sixteenth implementation, according to an eighteenth implementation, the feedback record is generated automatically by one or more semantic assessment tool analyzing the proposed sub-graph. This may allow further automation of the concept map graph construction session by employing automated tools to automatically generate the feedback for the proposed sub-graph.

Optionally, with reference to the first, the second and/or the third aspects of the invention and/or any of the previous implementations, according to a nineteenth implementation, a feedback is provided for a partial subset of the proposed sub-graph. The feedback for the partial subset is provided by the selected stored feedback record and/or the generated feedback record. This allows assessing partial subsets of the proposed sub-graph to indicate that some parts of the proposed sub-graph may be correct while other parts may not instead of simply indicating the entire proposed feedback as incorrect.

Optionally, with reference to the first, the second and/or the third aspects of the invention and/or any of the previous implementations, according to a twentieth implementation, a constructed concept map graph is updated to include the proposed sub-graph when the feedback record indicates a positive feedback. This allows construction of the concept map graph with correct proposed sub-graphs to visualize the concept map to the user(s) and/or reviewer(s). The constructed concept map graph may further serve as basis for the user(s) to derive additional proposed sub-graph(s).

Optionally, with reference to the first, the second and/or the third aspects of the invention and/or any of the previous implementations, according to a twenty first implementation, one or more of the reviewers is rated according to a number of feedback records the one or more reviewer generated. This may provide for an objective evaluation system and method for evaluating the reviewer(s) based on measurable means expressed through creation, review and/or assessment of the proposed sub-graphs and/or the concept map graph itself.

Optionally, with reference to the first, the second and/or the third aspects of the invention and/or any of the previous implementations, according to a twenty second implementation, the concept map is generated from a text using one or more text to map conversion tools. This may allow the reviewer to create, edit and/or manipulate the concept map graph in a natural textual format.

Optionally, with reference to the first, the second and/or the third aspects of the invention and/or any of the previous implementations, according to a twenty third implementation, the proposed sub-graph is generated from a text segment using one or more text to map conversion tools. This may allow the user to create, edit and/or manipulate the proposed sub-graph in a natural textual format.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Figure 7B:
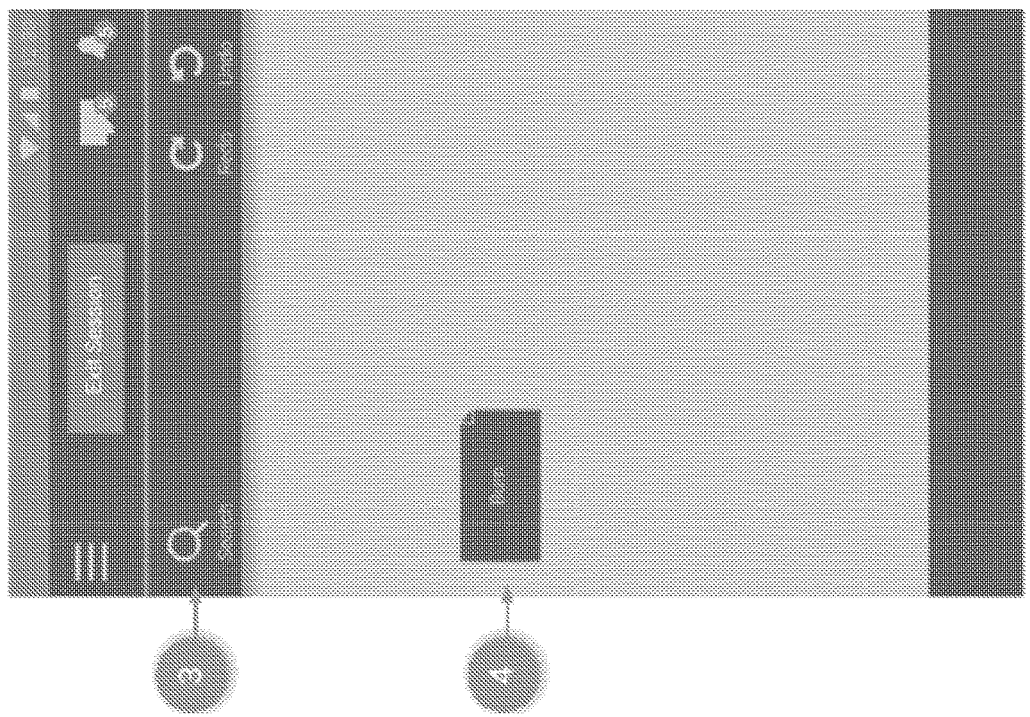
Figure 7A:
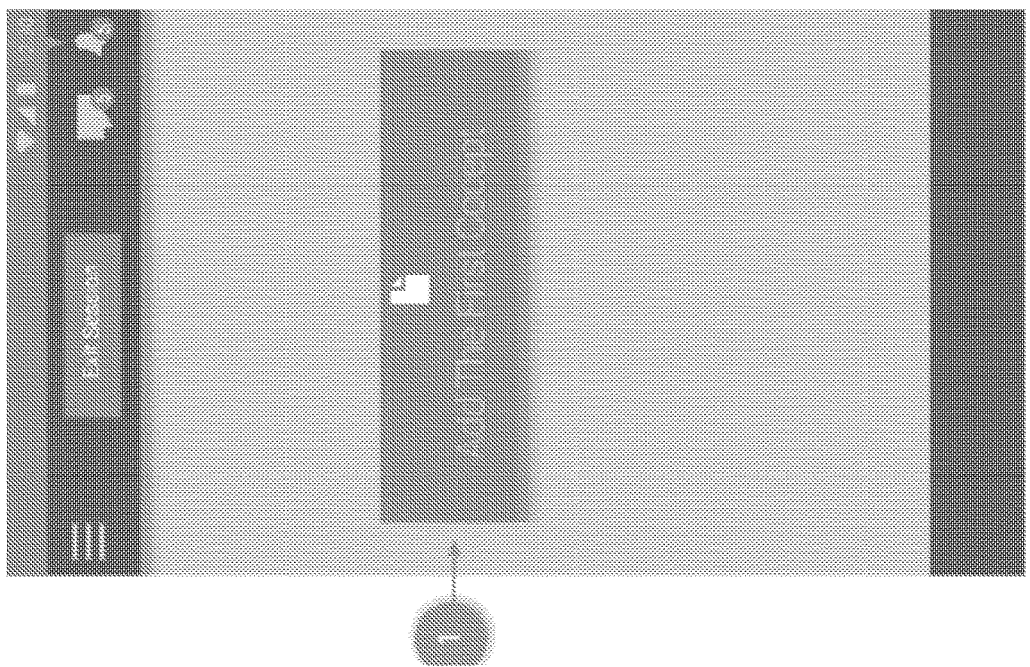
Figure 7D:
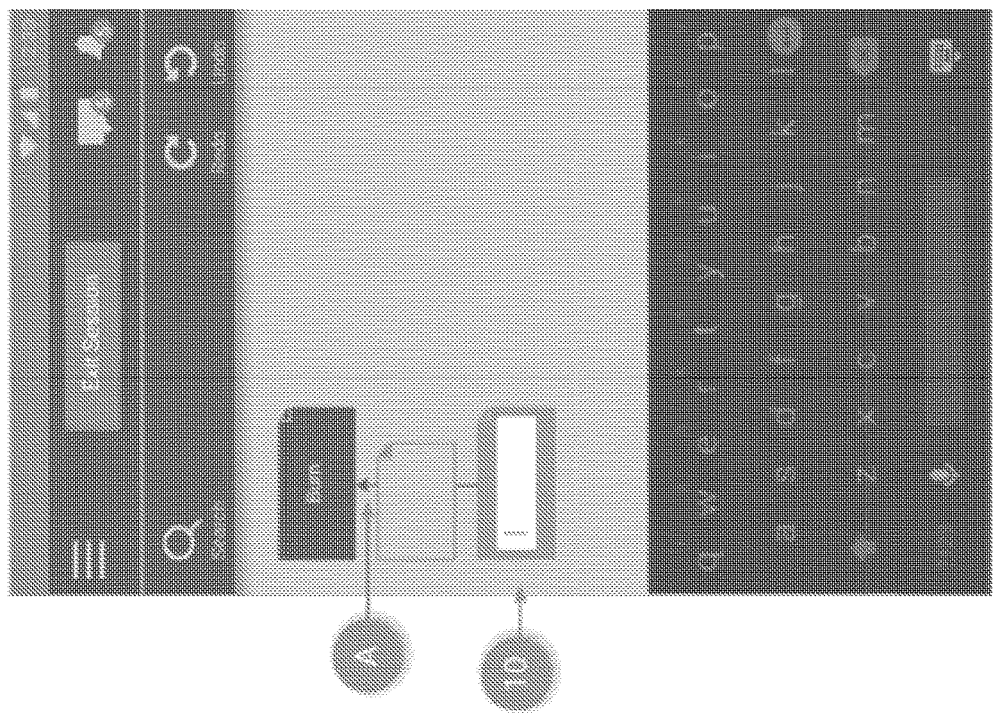
Figure 7C:
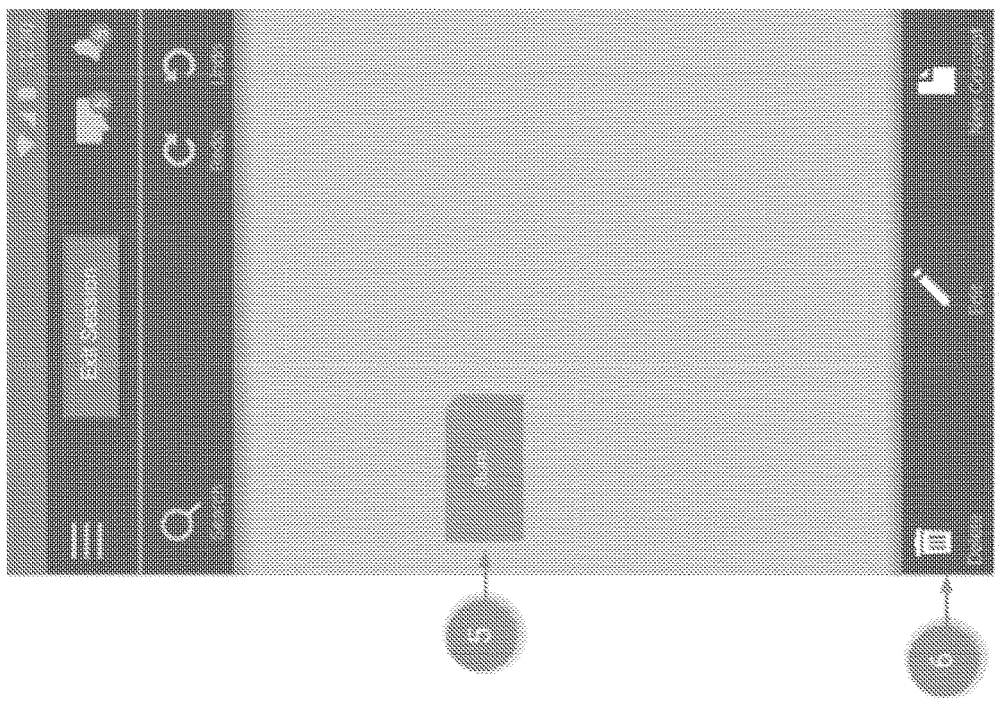
Figure 7F:
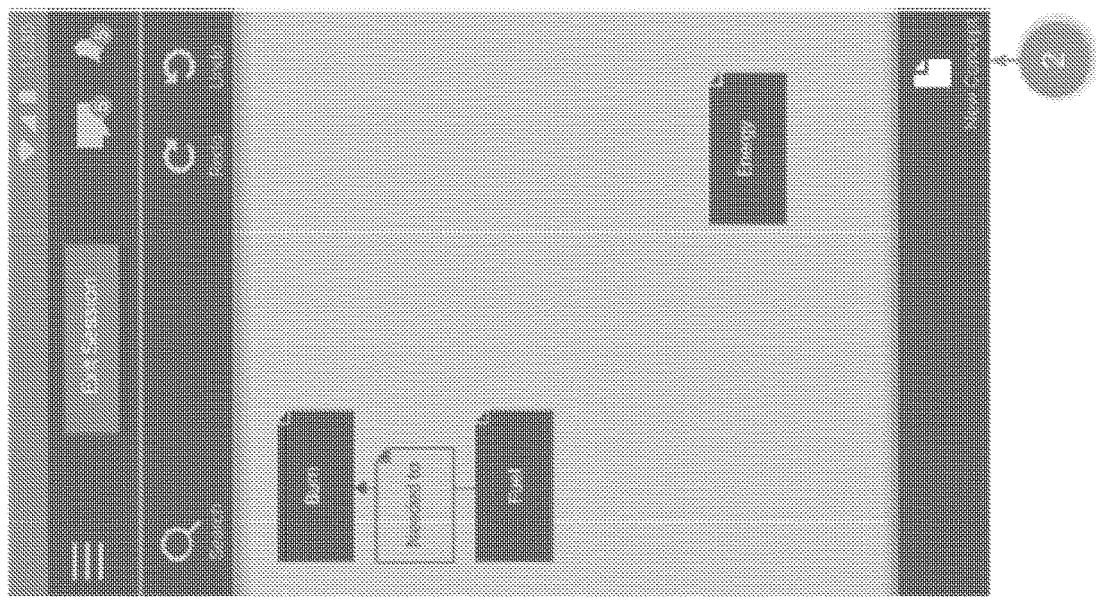
Figure 7E:
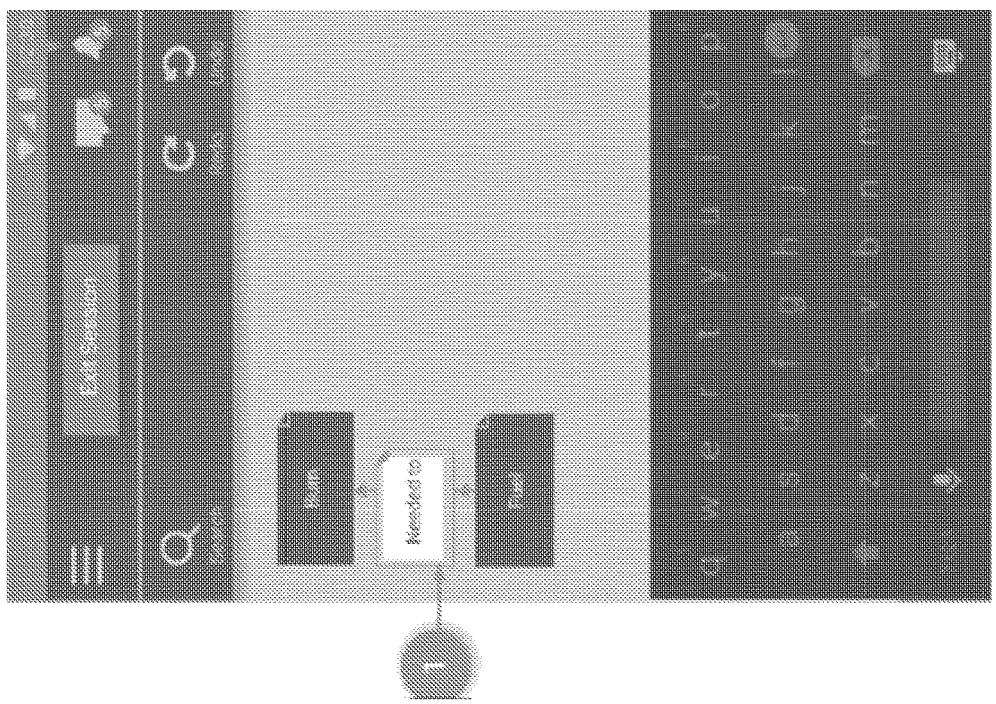
Figure 7H:
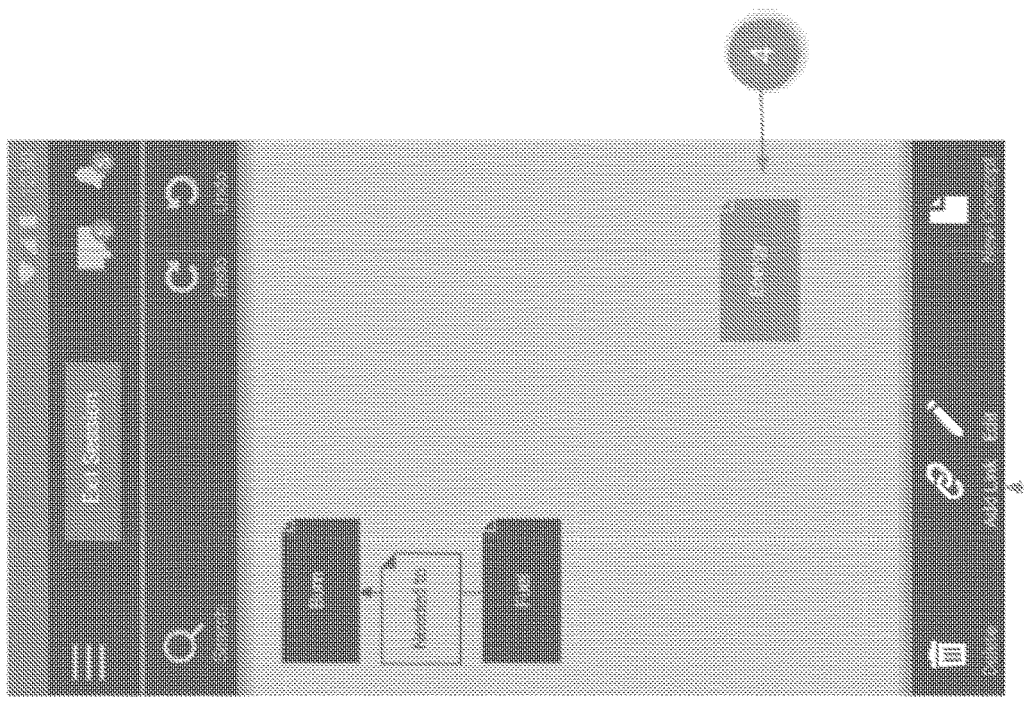
Figure 7G:
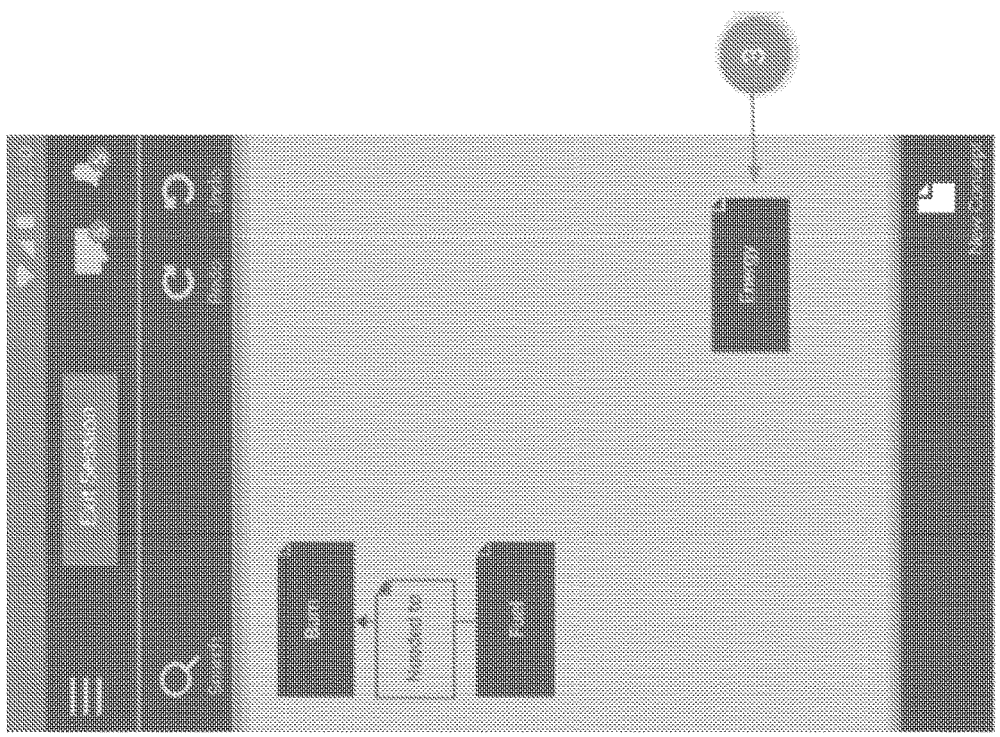
Figure 7J:
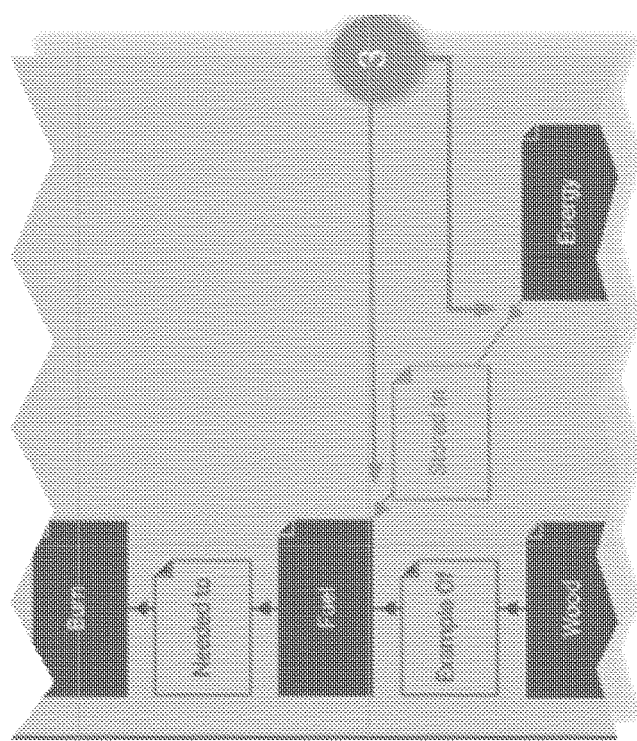
Figure 7I:
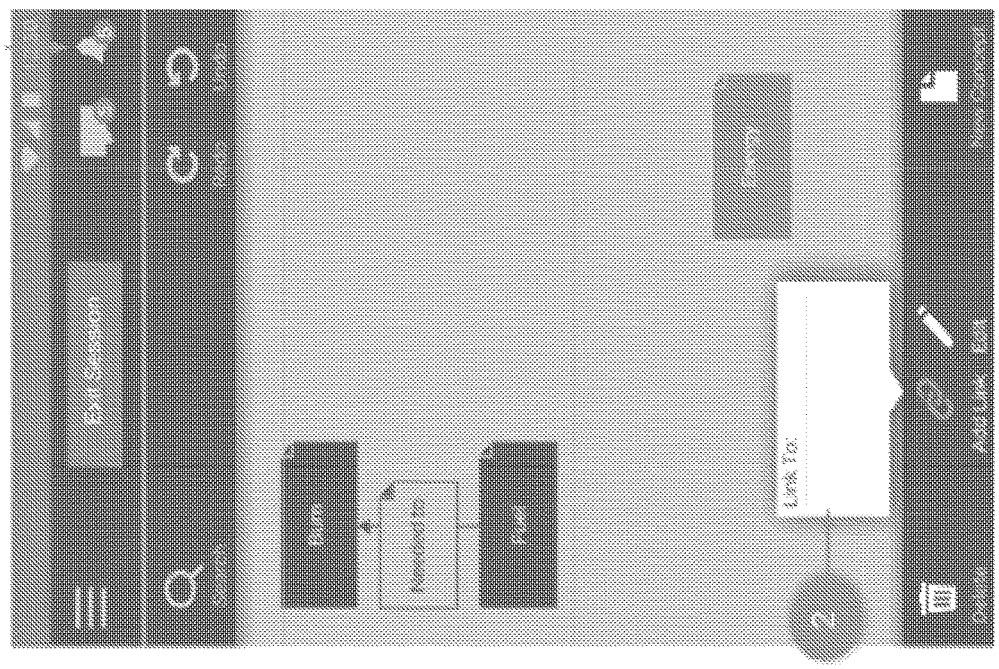
Figure 7L:
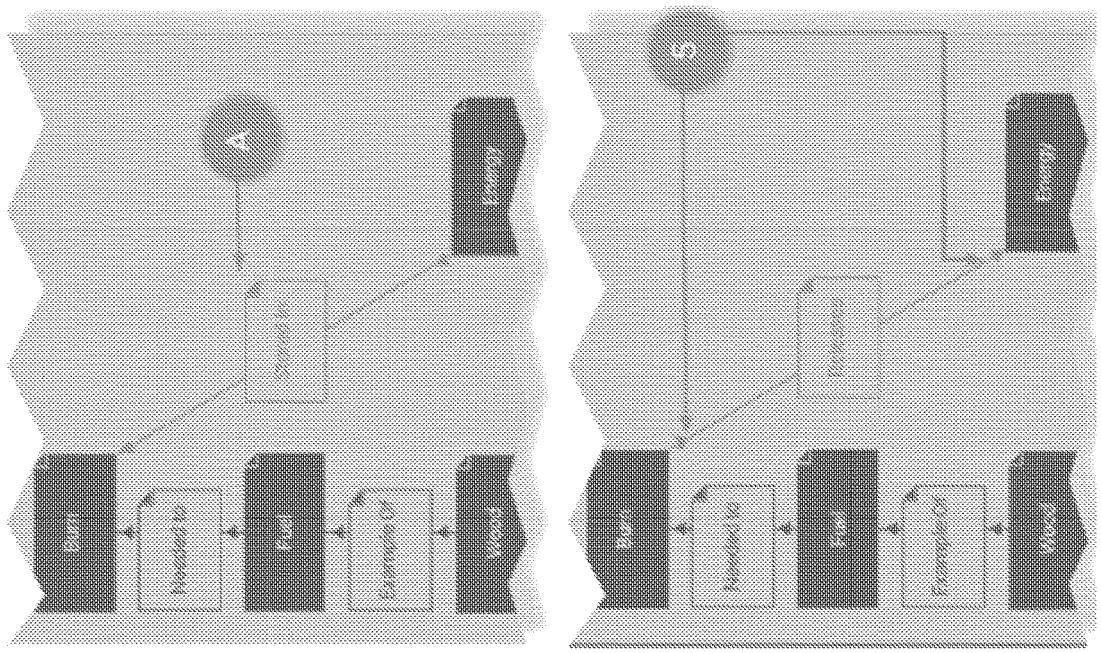
Figure 7K:
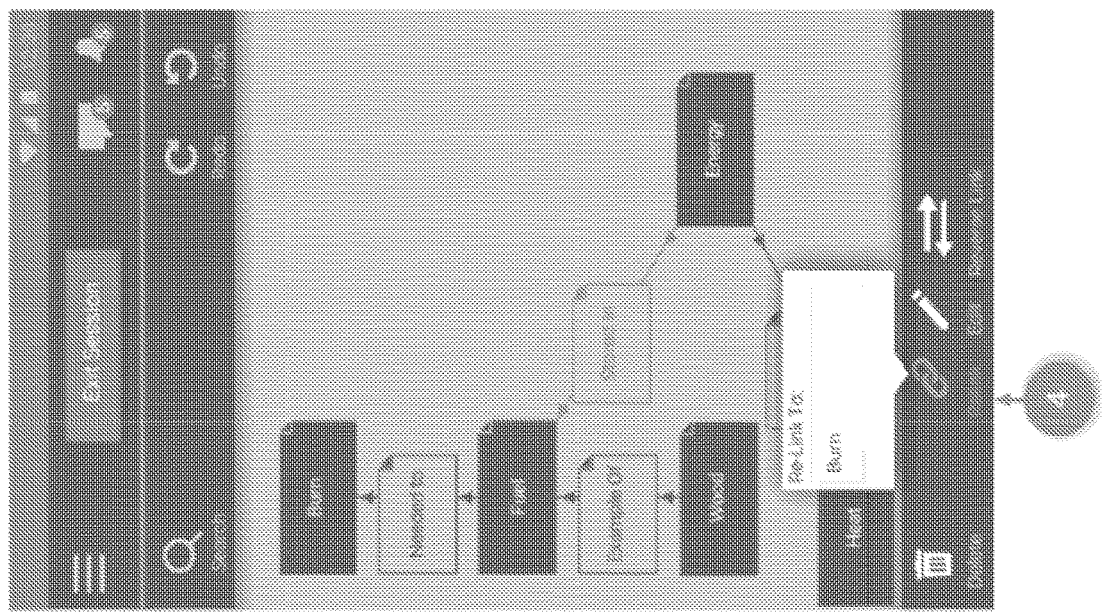
Figure 8C:
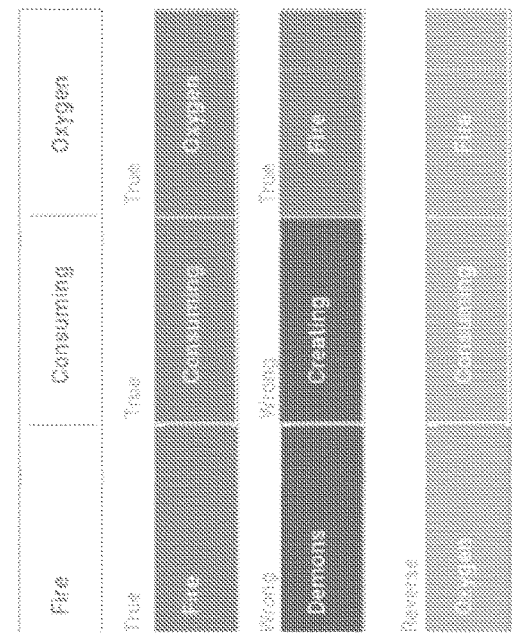
Figure 8B:
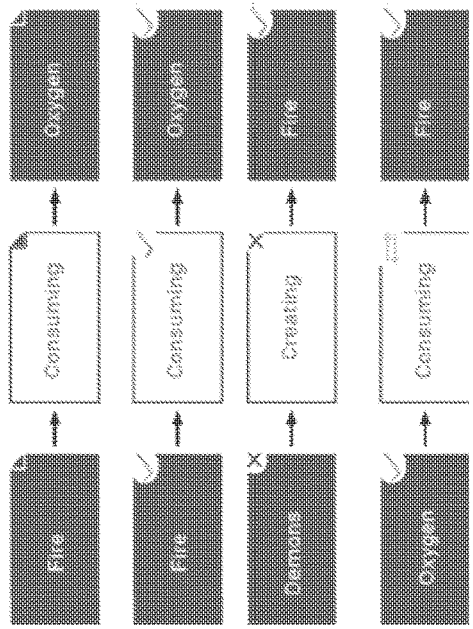
Figure 8A:
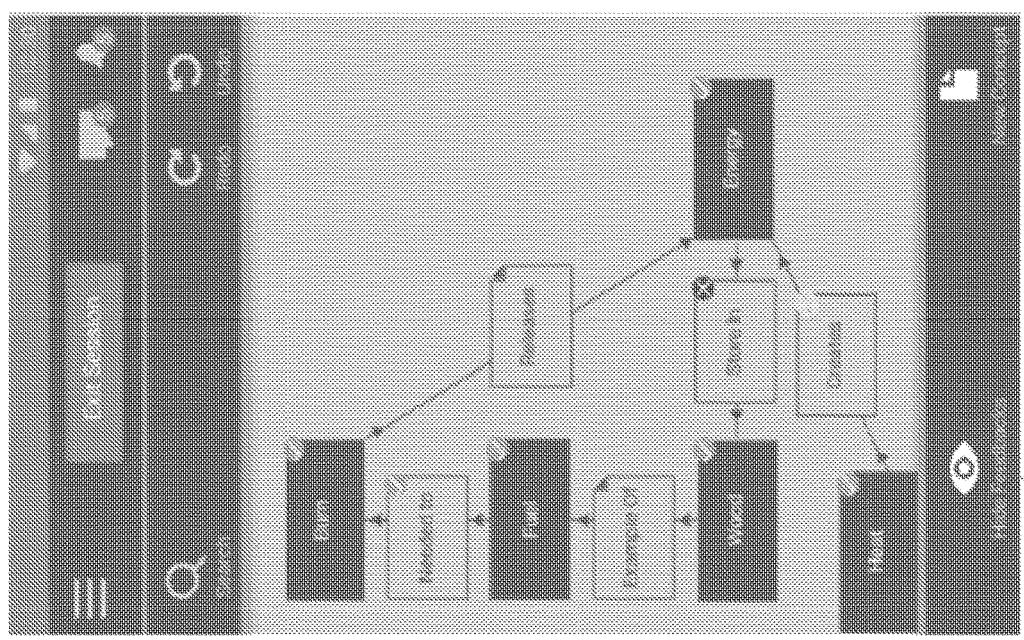

FIG. 7A, FIG. 7B, FIG. 7C, FIG. 7D, FIG. 7E, FIG. 7F, FIG. 7G, FIG. 7H, FIG. 7I, FIG. 7J, FIG. 7K and FIG. 7L are screen captures of an exemplary graph construction client application for use by a user participating in a concept map graph construction session, according to some embodiments of the present invention; and FIG. 8A, FIG. 8B and FIG. 8C are screen captures of exemplary graph construction client and reviewer applications presenting feedback records for a proposed sub-graph received during a concept map graph construction session, according to some embodiments of the present invention.

DESCRIPTION OF SPECIFIC EMBODIMENTS
OF THE INVENTION

The present invention, in some embodiments thereof, relates to assessing sub-graphs proposed for constructing a concept map graph and, more particularly, but not exclusively, to assessing sub-graphs proposed for constructing a concept map graph by applying automated assessment.

According to some embodiments of the present invention, there are provided methods, systems and computer program products for automatically assessing in the assessing of sub-graphs (queries) proposed by a plurality of users for constructing a concept map. The concept map may comprise a plurality of concepts, for example, ideas, entities, objects, processes, actions and/or the like which may be expressed through sematic representations, for example, a word, a phrase, a sentence, a picture, a video, a sound track and/or the like that are connected among themselves with suggested relationships. The concept map comprises a plurality of nodes each representing one of the concepts and one or more edges connecting the concept nodes and representing the relationship between the connected concept nodes. The concept map graph may be a directed graph, an undirected graph and/or a combination of thereof.

One or more reviewers, for example, a teacher, a lecturer, an instructor, a supervisor, an examiner and/or the like may conduct a concept map graph construction session in which the plurality of users may propose one or more sub-graphs for constructing the concept map graph and the reviewer(s) assess correctness of the proposed sub-graphs. The reviewers and/or the users may use client terminals, for example, a computer (e.g. a desktop, a laptop, etc.), a workstation, a mobile device, a Smartphone, a tablet, a processing node, a server and/or the like for communicating with each other during the session. The client terminals may present a Graphical User Interface (GUI) for viewing, creating, editing and/or altering the concept map graph and/or the proposed sub-graphs. The reviewer client terminal(s) and/or the user client terminals may be located in the same geographical location and/or distributed at a plurality of different geographical locations.

An automated assessment tool may compare each proposed sub-graph received from the client terminals of the users to a plurality of reference stored sub-graphs located in a stored sub-graphs database. Each of the stored sub-graphs is associated with a stored feedback record comprising one or more feedback entries generated previously by one or more reviewers for the respective stored sub-graph. The automated tool looks for a match of the proposed sub-graph with one of the stored sub-graphs. In case of a match, the automated tool may respond to the client terminal of the proposing user with the stored feedback associated with the matching stored sub-graph. In case of no match, the automated tool may forward the proposed sub-graph to the client terminal(s) of the reviewer(s) to allow the reviewer(s) to review and/or asses the proposed sub-graph using the GUI presented by his client terminal. Using the GUI, the reviewer(s) may review and/or assess the proposed sub-graph and generate a feedback record that may be transmitted to the client terminal of the proposing user(s). In case the feedback record, either the stored feedback record associated with the matching sub-graph and/or the generated feedback record, indicates a positive feedback, i.e. the proposed sub-graph is at least partially correct, the constructed concept map graph may be updated to include the proposed sub-graph.

Optionally, a consensus level threshold may be defined for the previously generated feedback(s) entries of the stored feedback record associated with the matching stored sub-graph. The consensus level indicates the level of uniformity among the feedback entries previously generated for the matching sub-graph. This may allow flexibility in reviewing and/or assessing the proposed sub-graph even when a matching stored sub-graph is found such that the reviewer(s), using the GUI presented by their client terminals may review and/or asses personally the proposed sub-graph in case the reviewer(s) deem the previously generated feedback(s) to be insufficiently conclusive.

Optionally, an automation level is estimated for the concept map graph construction session. The automation level may indicate a ratio of matching events in which a matching stored sub-graph is found in the database for the proposed sub-graph. The threshold(s) may be set for adjusting the automated assessment tool, system and/or process in order to allow for personal assessment of the proposed sub-graph(s) by the reviewer(s) even in case of a match.

Optionally, a workload is estimated for the reviewer(s) conducting the concept map graph construction session. The workload may indicate the number of proposed sub-graphs estimated to be forwarded to the reviewer(s) during the current session. The threshold(s) may be set for adjusting the automated assessment tool, system and/or process in order to allow for personal assessment of the proposed subgraph(s) by the reviewer(s) even in case of a match as long as the reviewer(s) are not overloaded with assessing other proposed sub-graphs.

Optionally, one or more of the thresholds is adjusted to forward more proposed sub-graphs to the reviewer(s) (even in case of a match) in order to expand, improve and/or enhance the stored sub-graphs database by adding additional feedback to the matching stored sub-graphs.

The automated assessing may present significant advantages compared to existing methods for assessing sub-graphs proposed for constructing the concept map graph. Typically, assessing users constructing the concept map graph is done manually where the reviewer(s) may need to review personally each proposed sub-graph and generate feedback for it. By automating the assessment process, a significantly larger number of proposed sub-graphs submitted by a significantly larger number of users may be reviewed and/or assessed than may be possible with existing methods. Since a significant portion of the proposed sub-graphs may be reviewed and/or assessed automatically, only those proposed sub-graphs not available in the database may be forwarded to the client terminal of the reviewer(s) for review and/or assessment. This may allow the reviewer(s) to accommodate more users in the session.

Moreover, while some automated tools may exist for assessing concept map graph construction, combining the automated assessment with a review and/or assessment made by the reviewer(s) may significantly improve the conducted session as well as it may benefit future sessions of concept map graph construction.

By forwarding at least some of the sub-graphs to the reviewer(s) even in case of a match event, the feedback for one or more of the sub-graphs may be improved, enhanced and/or become more comprehensive. This may serve future session of the concept map graph construction in which the automation level may increase thus allowing accommodation of even more users during a single session. However, one or more mechanisms are applied, for example, through the thresholds in order not to overload the reviewer(s) and allow them proper time to assess the proposed sub-graphs.

Furthermore, one or more mechanisms may be applied, for example, through the thresholds in order to allow the reviewer(s) flexibility, for example, a desire to personally review and/or assess a higher number of proposed sub-graphs. In particular, the reviewer(s) may set individual preferences regarding the proposed sub-graphs they wish to personally review based on the type, extent and/or the like of the feedback available for the matching sub-graph in the database.

In addition, the automated assessing of the concept map graph construction may provide an efficient and significantly objective tool for evaluating, rating and/or crediting the reviewers according to their effort, contribution and/or creativity. The automated assessing tool may evaluate, rate and/or credit the reviewers according to one or more parameters that may be objectively measured during one or more concept map graph construction sessions. The parameters may include, for example, the number of session conducted using a concept map graph provided by each reviewer, the number of users participating in session for constructing concept map graph(s) provided by each reviewer, the number of feedback records generated by each reviewer and/or the like.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
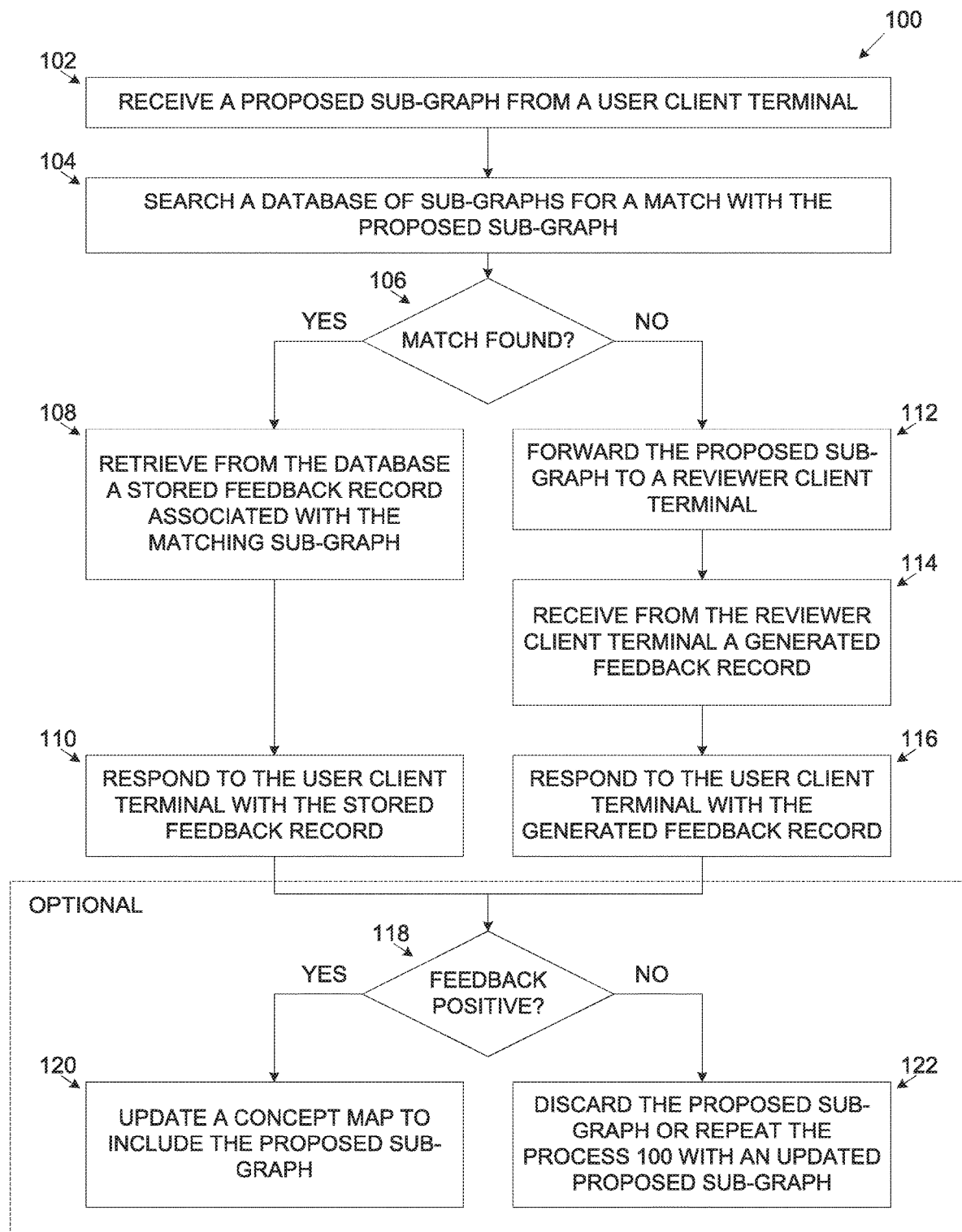
FIG. 1 is a flowchart of an exemplary process of assessing a sub-graph proposed for constructing a concept map graph, according to some embodiments of the present invention.

Referring now to the drawings, FIG. 1 illustrates a flowchart of an exemplary process of assessing a sub-graph proposed for constructing a concept map graph, according to some embodiments of the present invention. A process 100 may be executed to support a reviewer for reviewing and/or assessing sub-graphs proposed by a plurality of users for constructing a concept map. The concept map may include a plurality of concepts, for example, ideas, entities, objects, processes, actions and/or the like which may be expressed through sematic representations, for example, a word, a phrase, a sentence, a picture, a video, a sound track and/or the like that are connected among themselves with suggested relationships. The concept map may be represented by a graph comprising a plurality of nodes each representing one of the concepts and one or more edges connecting the concept nodes and representing the relationship between the connected concept nodes. The concept map graph may be a directed graph, an undirected graph and/or a combination of thereof.

The users may use a user client terminal presenting a GUI to create the concept map by proposing sub-graphs of the concept map graph. Each sub-graph may constitute the complete concept map graph or part thereof. Correctness of the of the proposed sub-graph may be assessed by one or more reviewers, for example, a teacher, a lecturer, an instructor, a supervisor, an examiner and/or the like using a reviewer client terminal presenting a GUI to display proposed sub-graphs. One or more automated tools, systems, platforms and/or the like may be used to support the reviewer(s) by assessing automatically the proposed sub-graph(s). The automated tool may (semantically) compare the proposed sub-graph to a plurality of reference stored sub-graphs stored in a stored sub-graphs database in order to match the proposed sub-graph to one of the stored sub-graphs. Each of the stored sub-graphs is associated with a stored feedback record comprising feedback entries previously generated for assessing the corresponding stored sub-graphs. In case of a match, the proposing user may be responded with the stored feedback record associated with the matching stored sub-graph. In case of no match, the proposed sub-graph may be forwarded to the reviewer for assessment. The reviewer may review and assess the proposed sub-graph and generate a feedback record that may be provided to the proposing user. In case the feedback record, either the stored feedback record associated with the matching sub-graph and/or the generated feedback record indicates a positive feedback, i.e. the proposed sub-graph is at least partially correct, the constructed concept map graph may be updated to include the proposed sub-graph and/or the alteration induced by the proposed sub-graph to the concept map graph.

While the process 100 may be applied for assisting a plurality of reviewers conducting a concept map graph construction session, for brevity the process 100 is presented for a single reviewer. However, the process 100 may be extended for the plurality of reviewers using the same methodology, techniques and methods presented hereinafter.

Figure 2:
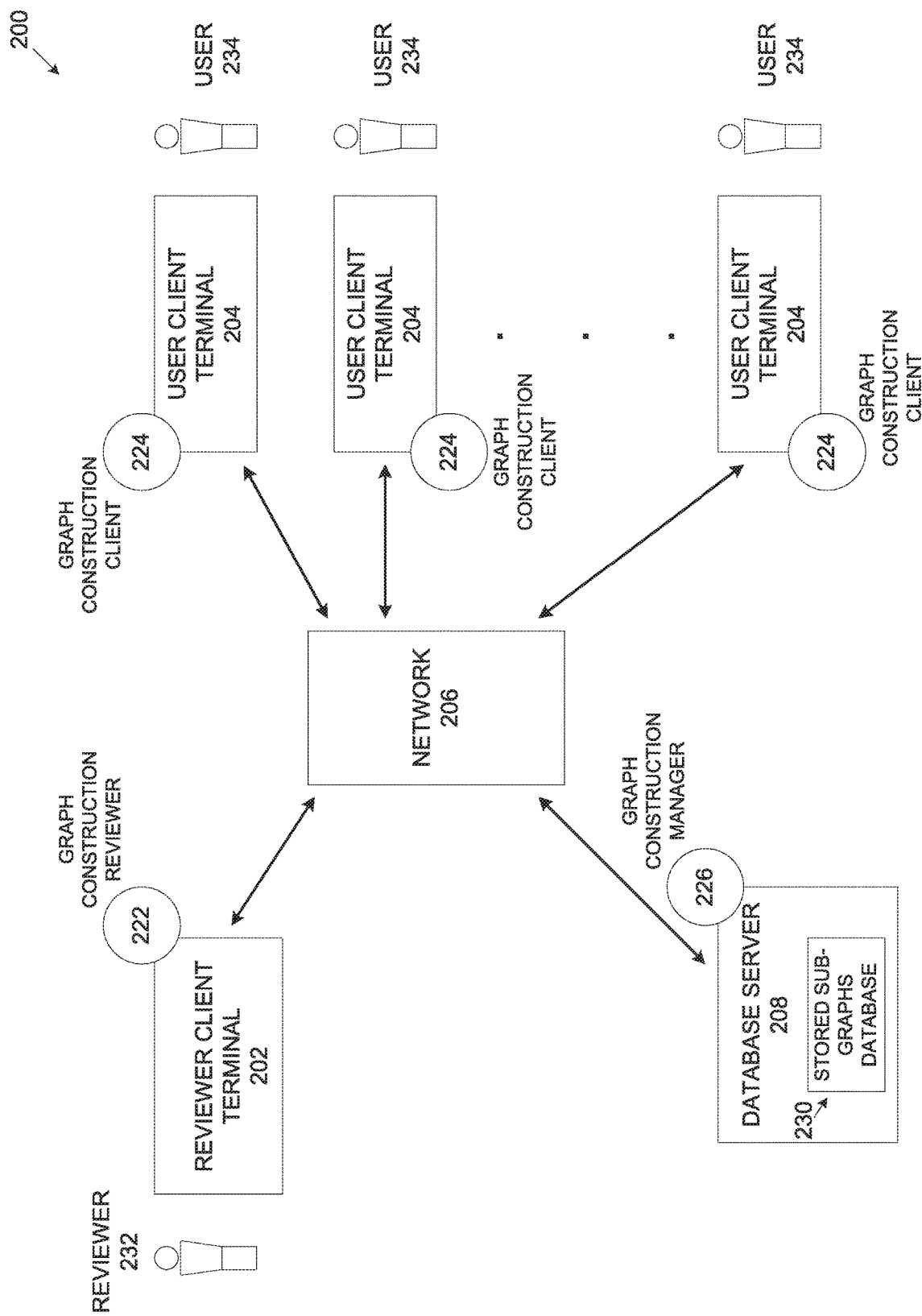
FIG. 2 is a schematic illustration of an exemplary system for assessing a sub-graph proposed for constructing a concept map graph, according to some embodiments of the present invention.

Reference is also made to FIG. 2, which is a schematic illustration of an exemplary system for assessing a sub-graph proposed for constructing a concept map graph, according to some embodiments of the present invention. A system 200 for executing a process such as the process 100 includes a plurality of client terminals, an reviewer client terminal 202 used by an reviewer 232 and a plurality of client terminals 204 each used by one of a plurality of users 234. Each of the client terminals 202 and/or 204 may be, for example, a computer (e.g. a desktop, a laptop, etc.), a workstation, a mobile device, a Smartphone, a tablet, a processing node, a server and/or the like. Optionally, the system 200 may include additional reviewers such as the reviewer 232 each using an reviewer client terminal such as the reviewer client terminal 202 who may be, for example, a teacher, a lecturer, an instructor, a supervisor, an examiner and/or the like.

The client devices 202 and 204 may include one or more communication interfaces to connect to one or more networks 206 for communicating with one or more of the other client terminals 202 and/or 204. The network 206 may be facilitated through one or more wired networks, for example, LAN, WAN and/or the like and/or one or more wireless networks, for example, Wireless Local Area Network (WLAN) (e.g. Wi-Fi), cellular network and/or the like. As a the reviewer client terminal(s) 202 and the user client terminals 204 may be distributed in a single location and/or over a plurality of remote locations, the reviewer client terminal(s) 202 and the user client terminals 204 may utilize the network(s) 206 accordingly to establish communication among themselves. For example, the reviewer client terminal 202 and the user client terminals 204 may be located at the same geographical location, for example, a class room. In such case, the reviewer client terminal 202 and the user client terminals 204 may use for example, a LAN, a WLAN and/or the like. In another example, one or more of the reviewer client terminal(s) 202 and/or the user client terminals 204 may be located at different geographical locations. In such deployment, the reviewer client terminal 202 and/or the user client terminals 204 may communicate over, for example, the internet, a cellular link and/or the like facilitated by accessing the network(s) 206.

Each of the client devices 202 and 204 may include a processor(s) comprising one or more one or more processors (homogenous or heterogeneous), which may be arranged for parallel processing, as clusters and/or as one or more distributed core processing units. The processor(s) may execute one or more software modules, for example, a process, an application, an agent, a utility, a service and/or the like wherein a software module refers to a plurality of program instructions stored in a storage medium and executed by the processor(s). The storage medium may include one or more non-transitory storage devices, for example, a hard drive, a Flash array, an attached storage media and/or the like. The storage medium may further include one or more volatile storage devices, for example, a random access memory (RAM) to which one or more software modules may be loaded from one or more of the non-transitory storage devices and/or from one or more remote locations over the network 206. The software module(s) may further include one or more local software modules, for example, an agent a web browser and/or the like which provide a remote service provided by for example, a server, a cloud service and/or the like.

The processor(s) of the reviewer client terminal 202 may execute one or more one or more software modules, for example, a graph construction reviewer 222. The graph construction reviewer 222 may present a GUI to allow the reviewer 232 to review and/or assess proposed sub-graphs received from the users 234 using the user client terminals 204. The graph construction reviewer 222 may further allow the reviewer 232 to view and/or manipulate the concept map graph, for example, create, edit, alter and/or the like. The processor(s) of the user client terminals 202 may execute one or more one or more software modules, for example, a graph construction client 224 presenting a GUI to allow the users 234 to view, create and/or propose one or more sub-graphs constituting the concept map graph.

Optionally, the graph construction reviewer 222 utilizes one or more conversion tools as known in the art that may convert a text, for example, word(s), sentence(s), paragraph(s) and/or the like to a concept map graph. The text may be structured, unstructured and/or a combination thereof. This may allow the reviewer(s) 232 to create, edit and/or manipulate the concept map graph in a natural textual format. The conversion tool(s) may analyze the text generated by the reviewer(s) 232 and create, alter and/or otherwise manipulate the concept map graph which may comprise a plurality of nodes and edge(s) according to the concepts and/or relations expressed in the submitted text. The conversion tool(s) may extract the concept nodes and their relations by analyzing the text using one or more methods, for example, a syntactic analysis, a semantic analysis, a morphologic analysis, a linguistic analysis and/or the like. Additionally and/or attentively, the conversion tool(s) are employed by the graph construction manager 226 which receives the generated text from the graph construction reviewer 222 and converts it to the concept map graph.

The system 200 may further include a database server 208 connecting to the network 206. The database server 208 may include a processor(s) such as the processor(s) of the client terminals 202 and/or 204, a storage medium such as the storage medium of the client terminals 202 and/or 204 and one or more network interfaces such as the network interface(s) of the of the client terminals 202 and/or 204. The database server 208 may store one or more data structures, for example, a list, a database and/or the like, in particular a stored sub-graphs database 230. The processor(s) of the database server may further execute one or more software modules, for example, a graph construction manager 226 to manage construction of the concept map graph, in particular for evaluating sub-graphs proposed by the users 234 against the stored sub-graphs available in the stored sub-graphs database 230. The graph construction manager 226 may further manage accesses to stored sub-graphs database 226. Optionally, the database server 208 is implemented as a remote service, for example, a cloud service and/or the like which stores the stored sub-graphs database 230 and access to it.

The system 200 may be deployed in a plurality of different configurations. For example, the database server 208 may be integrated with one or more of the reviewer client terminal(s) 202 and/or the user client terminals 204. In another example, the graph construction manager 226 may be executed by one or more of the reviewer client terminal(s) 202 and/or the user client terminals 204 while the database server 208 stores the stored sub-graphs database 230. In another example, the graph construction manager 226 is integrated with the graph construction reviewer 222 executed by the reviewer client terminal 202. In another example, the graph construction manager 226 is provided as a remote service, for example, a cloud service.

As shown at 102, the graph construction manager 226 receives via the network 206 one or more proposed sub-graphs from one or more of the graph construction clients 224 executed by the user client terminals 204. The proposed sub-graphs may be created by each user 234 through the graph construction client 224 executed by his user client terminal 204. The proposed sub-graph may be transmitted by graph construction clients 224 from the user client terminal 204 as a message over the network 206. The user(s) 234 may create the proposed sub-graph(s) according to the subject, topic, question and/or the like illustrated by the concept map. For example, the user(s) 234 may create the proposed sub-graph(s) to answer a question presented through the graph construction client 224.

The proposed sub-graph(s) are proposed by the user(s) 234 to create, edit, alter, expand and/or reduce the concept map graph. The concept map graph may be created, conceived and/or outlined by one or more of the reviewers 232 using the graph construction reviewer 222 executed on their reviewer client terminal 202. Optionally, the concept map graph may be retrieved from a database such as the database 230 after stored in the past by one or more reviewers 232 during. As discussed before, the concept map graph comprises a plurality of concept nodes each representing a concept, for example, an idea, an entity, an object, a process, an action and/or the like which may be expressed through sematic representations, for example, a word, a phrase, a sentence, a picture, a video, a sound track and/or the like and one or more relation edges connecting the concept nodes. The concept map graph may be a directed graph, an undirected graph and/or a combination of thereof. Each proposed sub-graph may include a plurality of (concept) nodes and one or more edges representing the relationship between the nodes in the proposed sub-graph. Each proposed sub-graph may constitute the entire concept map or part thereof.

Each proposed sub-graph may further include one or more existing nodes approved by the reviewer as part of the concept map graph. The existing node(s) may serve as a starting point, a suggested building block, a reference and/or the like.

Optionally, one or more of the user(s) 234, using the graph construction clients 224, may submit a text, for example, a sentence, a paragraph, a set of one or more words and/or the like. The graph construction clients 224 may use one or more of the conversion tools to convert the submitted text to the proposed sub-graph by analyzing the submitted text and creating a sub-graph comprising a plurality of nodes and one or more edges according to the relations expressed in the submitted text. Additionally and/or alternatively, the conversion tool(s) are employed by the graph construction manager 226 to create the proposed sub-graph from the text generated by the user(s) 234 and received from the graph construction client(s) 224. In another example, the conversion tools may be applied by both the graph construction clients 224 and the graph construction manager 226 such that a partial conversion is performed by the graph construction clients 224 and an additional partial conversion is done by the graph construction manager 226.

Optionally, the graph construction manager 226 aggregates a plurality of proposed sub-graphs proposed by multiple users 234 who collaborate in creating and/or altering the concept map graph. The plurality of user(s) 234 using instances of the graph construction client 224 executed by their user client terminals 204 may send proposed sub-graphs to the graph construction manager 226. The collaboration may be simultaneous, i.e. at the same time and/or distributed over time.

As shown in 104, the graph construction manager 226 searches the stored sub-graphs database 230 to look for a match of each of the received proposed sub-graphs with one of the reference stored sub-graphs.

The stored sub-graphs database 230 may include a plurality of reference sub-graphs that were previously assessed by one or more reviewers during one or more previous sessions for constructing the concept map graph. Each of the stored sub-graphs is associated with a stored feedback record comprising one or more feedback entries, each indicating an assessment level, for example, correctness, relevance and/or applicability of the respective stored sub-graph. The feedback record may include a plurality of feedback types, for example, a simple (binary) feedback indicating, for example, yes or no, right or wrong, relevant or not-relevant and/or the like. The feedback record may further include more complex feedback types, for example, a score, a template phrase feedback and/or the like. For example, the score may include a range indicating a correctness level (a score) of the associated sub-graph, for example, on a scale of 1-5. The template phrase feedback may include, for example, a plurality of pre-defined phrases indicative of the associated feedback, for example, "too general sub-graph, try to express explicitly", "too explicit sub-graph, try to generalize" and/or the like. The feedback record may also include free text feedback generated by one or more reviewers 232.

Optionally, one or more feedback entries included in the feedback record are generated for the respective stored sub-graph by one or more users 234 using the GUI presented by the graph construction client 224. More optionally, the feedback entry(s) generated by the user(s) 234 is approved by one or more of the reviewers 232 through the GUI presented by the graph construction client 222 before added to the feedback record.

Additionally and/or attentively, one or more semantic assessment tools, for example, a speech processing tool, a language processing tool and/or the like are applied to one or more of the stored sub-graphs to create one or more of the feedback entries included in the associated stored feedback record. For example, the semantic assessment tool(s) may identify one or more troponyms, synonyms, antonyms and/or the like and generate the feedback for the respective stored sub-graph.

The graph construction manager 226 looks for a matching stored sub-graph by comparing the proposed sub-graph with each of the reference stored sub-graphs. For example, the graph construction manager 226 may compare the (semantic) content of the concept nodes of the proposed sub-graph to the content of the concept nodes of each of the stored sub-graphs. The graph construction manager 226 may also compare the (semantic) description assigned to the edge(s) in the proposed sub-graph against the description of the corresponding edge in the stored sub-graphs. Based on the semantic comparison, the graph construction manager 226 may identify a full match between the proposed sub-graph and one of the stored sub-graphs, a partial match and/or no match.

Optionally, the graph construction manager 226 applies one or more of the semantic assessment tools to identify one or more stored sub-graph which may be semantically similar to the proposed sub-graph while not using the exact same wording, grammar, outline, layout and/or the like.

As shown in 106, which is a decision point, the graph construction manager 226 determines a course of action according to a result of the matching. In case of a match event when the graph construction manager 226 finds a matching stored sub-graph that matches the proposed sub-graph, the graph construction manager 226 branches to 108. In case of no match, i.e. the graph construction manager 226 did not find a matching stored sub-graph that matches the proposed sub-graph, the graph construction manager 226 branches to 112.

Optionally, in case the graph construction manager 226 determines that the feedback record associated with the matching stored sub-graph is incomplete, the graph construction manager 226 branches to 112. The graph construction manager 226 may determine that the associated stored feedback record is incomplete when, for example, the associated stored feedback record includes feedback for a partial subset of the matching stored sub-graph and/or the like.

As shown in 108, the graph construction manager 226 retrieves from the stored sub-graphs database 230 the stored feedback record associated with the matching stored sub-graph.

As shown in 110, the graph construction manager 226 responds (transmits) the retrieved stored feedback record to the graph construction client 224 executed by the user client terminal 204 of the proposing user 234 who proposed the proposed sub-graph. The response may be transmitted to the user client terminal 204 of the proposing user 234 as a message over the network 206. The graph construction client 224 may present the received feedback record to the proposing user 234 through the GUI. Optionally, the graph construction manager 226 may transmit the stored feedback record to one or more graph construction clients 224 of one or more of the other users 234.

As shown in 112, the graph construction manager 226 forwards the proposed sub-graph to the reviewer 232 using the graph construction reviewer 222 executed by the reviewer client terminal 202. Optionally, the graph construction manager 226 forwards the proposed sub-graph to a plurality of reviewers 232 each using a reviewer client terminal 202 executing an instance of the graph construction reviewer 222.

In some embodiments of the present invention the graph construction manager 226 may adapt the automated assessment process 100 may according to one or more operational condition.

The graph construction manager 226 may forward the proposed sub-graph to the graph construction reviewer 222 executed by the reviewer client terminal 202 even when a matching stored sub-graph for the proposed sub-graph is available in the stored sub-graphs database 230. For example, the reviewer 232 may wish to review and/or assess one or more proposed sub-graphs even when such proposed sub-graphs were reviewed and assessed in the past thus having a matching sub-graph associated with a stored feedback record. This may allow the reviewer 232 to increase his impact factor on the responses provided to the users 234, by giving additional and/or more advanced and/or comprehensive feedback and/or the like. In another example, in order to improve and/or enhance the stored sub-graphs database 230 by generating a more comprehensive feedback record for one or more of the stored sub-graphs with additional feedback from the reviewer 232, the graph construction manager 226 may forward the proposed sub-graph to the reviewer 232 to get additional feedback generated by the reviewer 232 for the proposed sub-graph.

Optionally, the proposed sub-graph is forwarded to the reviewer 232 in case of the match (a matching stored sub-graph for the proposed sub-graph is available in the stored sub-graphs database 230) when the feedback record associated with the matching sub-graph is incomplete. For example, the feedback record associated with the matching stored sub-graph may include only part of the feedback types, for example, the simple feedback while missing the template phrase feedback and/or the free text feedback.

Figure 3:
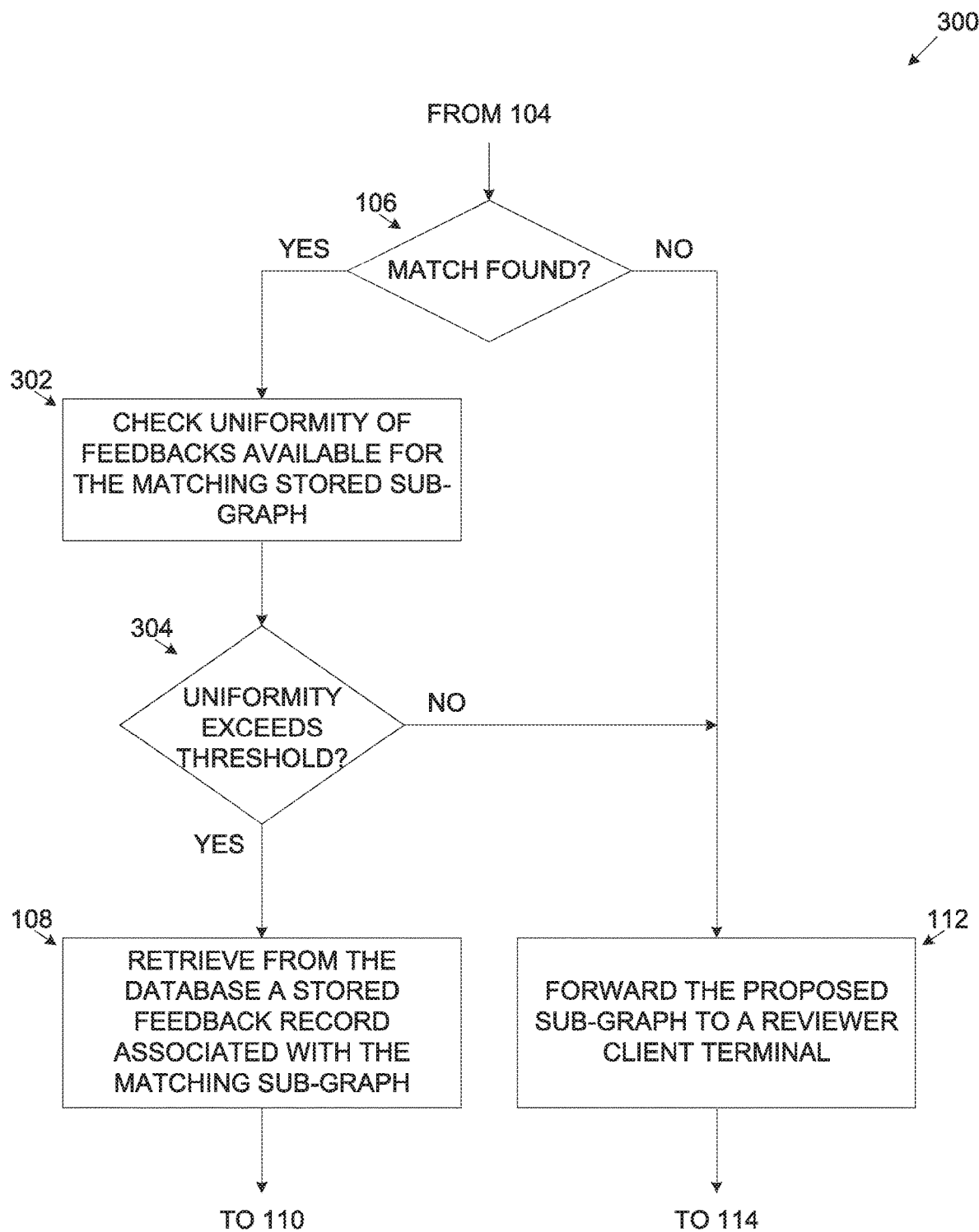
FIG. 3 is a flowchart of an exemplary process of assessing a sub-graph proposed for constructing a concept map graph using previously generated feedback, according to some embodiments of the present invention.

Reference is now made to FIG. 3, which is a flowchart of an exemplary process of assessing a sub-graph proposed for constructing a concept map graph using previously generated feedback, according to some embodiments of the present invention. A process 300 which is an extension of a section of a process such as the process 100 executed in a system such as the system 200 begins after step 106 of the process 100.

As shown at 302, in case a graph construction manager such as the graph construction manager 226 finds a matching stored sub-graph that matches the proposed sub-graph, the graph construction manager 226 may compare a level of consensus within the stored feedback record associated with the matching stored sub-graph against a uniformity threshold. The consensus level may indicate the uniformity among a plurality of feedbacks entries of the stored feedback record which are generated previously (in the past, prior and/or during the current session of the concept map graph construction) by a plurality of reviewers such as the reviewer 232 for the matching stored sub-graph. The plurality of feedback entries previously generated for the matching stored sub-graph may be stored in the feedback record associated with the matching stored sub-graph. The graph construction manager 226 may aggregate the plurality of feedback entries of one or more stored feedback records to calculate a consensus value for the level of consensus for one or more respective stored sub-graphs. For example, assuming, five reviewers 232 generated feedback (entries) for a certain stored sub-graph, where three reviewers 232 assessed a score of 3 out of 5 for the certain stored sub-graph, one reviewer 232 assessed a score of 4 out of 5 for the certain stored sub-graph and one reviewer 232 assessed a score of 5 out of 5 for the certain stored sub-graph. Based on the scores, the graph construction manager 226 may calculate the consensus value by, for example, averaging the scores yielding a consensus value of 3.6.

Optionally, the construction manager 226 uses the weights assigned to the feedback entries in the stored feedback record associated with the matching stored sub-graph to calculate the consensus level. Where the weights assigned to the feedback entries may indicate the seniority, experience and/or rating of the reviewer 232 who generated the feedback entry.

Optionally, the construction manager 226 analyzes partial subsets of the proposed sub-graph compared to one or more partially matching stored sub-graph. Based on the analysis, the construction manager 226 may calculate the consensus value for the subset(s) of the proposed sub-graphs. For example, assuming the proposed sub-graph comprises two concept nodes and a directed edge (relationship link). One or more partially matching stored sub-graph may match (include) the two concept nodes present in the proposed sub-graph, but may not match (include) the edge of the proposed sub-graph. The construction manager 226 may calculate the consensus value for one or more of the subsets of the proposed sub-graph. For example, calculate a consensus value for one or more of the two concept nodes of the proposed sub-graph and/or for the edge of the proposed sub-graph.

The reviewer 232 may set a uniformity threshold to define the minimum consensus value the reviewer 232 requires to allow the graph construction manager 226 to respond automatically to the proposing user 234 with the stored feedback record associated with a matching stored sub-graph. In other words the reviewer 232 indicates that in case the consensus value does not exceed a certain level (uniformity threshold), the reviewer 232 would like to assess personally the proposed sub-graph regardless of the fact that a stored feedback is available for the proposed sub-graph.

As shown at 304, which is a decision point, the graph construction manager 226 compares the consensus value calculated for the matching stored sub-graph and compares the calculated consensus value with the uniformity threshold set by the reviewer 232. In case the calculated consensus value exceeds the uniformity threshold, the graph construction manager 226 proceeds to step 108 of the process 100 and retrieves the stored feedback record from the stored sub-graphs database 230. In case the calculated consensus value does not exceed the uniformity threshold, the graph construction manager 226 proceeds to step 112 of the process 100 and forwards the proposed sub-graph to the reviewer 232. For example, to continue the previous example, assuming the reviewer 232 set the uniformity level to 3.5, the graph construction manager 226 proceeds to step 108 since the calculated consensus value (3.6) exceeds the uniformity level (3.5). Assuming the reviewer 232 set the uniformity level to 4, the graph construction manager 226 proceeds to step 112 since the calculated consensus value (3.6) does not exceed the uniformity level (4).

Optionally, graph construction manager 226 compares the consensus value calculated for the partial subset(s) of the proposed sub-graph and compares the calculated consensus value with the uniformity threshold set by the reviewer 232. The graph construction manager 226 may further aggregate the consensus value calculated for the partial subset(s) for a plurality of subsets of the proposed sub-graph and compares the outcome with the uniformity threshold set by the reviewer 232.

Optionally, the reviewer 232 may set a feedback number threshold. The feedback number threshold defines a minimum number of feedback entries previously generated by the plurality of reviewers 232 for the matching stored sub-graph. Naturally, the previously generated feedback entries are available in the associated feedback record. For example, the reviewer 232 may set the feedback number threshold to ten. In case the graph construction manager 226 identifies that only four feedback entries are available in the feedback record associated with the matching stored sub-graph, the graph construction manager 226 may proceed to step 112 and forwards the proposed sub-graph to the reviewer 232.

Figure 4:
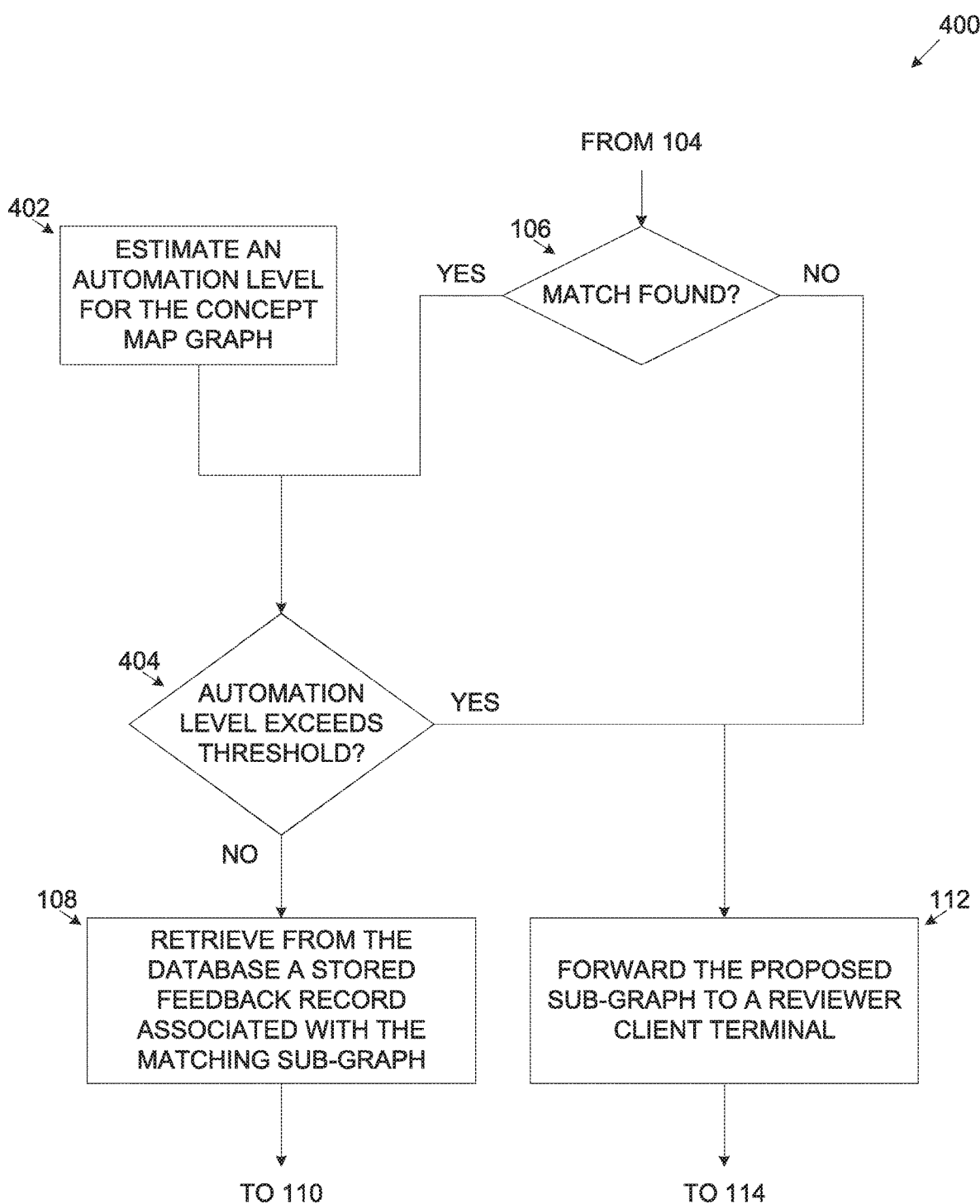
FIG. 4 is a flowchart of an exemplary process of assessing a sub-graph proposed for constructing a concept map graph with automation level adaptation, according to some embodiments of the present invention.

Reference is now made to FIG. 4, which is a flowchart of an exemplary process of assessing a sub-graph proposed for constructing a concept map graph with automation level adaptation, according to some embodiments of the present invention. A process 400 which is an extension of a section of a process such as the process 100 executed in a system such as the system 200 begins after step 106 of the process 100.

As shown at 402, a graph construction manager such as the graph construction manager 226 estimates an automation level during the current concept map graph construction session. The automation level may indicate the ratio of match events in which a matching stored sub-graph is found for the proposed sub-graph (query) in the stored sub-graph database 230. For each of the match events, the graph construction manager 226 may respond automatically to the proposing user 234 with the stored feedback retrieved from the stored sub-graphs database 230.

The graph construction manager 226 may estimate the expected automation level based on the automation level identified for a group of proposed sub-graphs (queries) proposed recently during the current session, for example, 30 sub-graphs and/or the like. Based on the identified matching events for the recently proposed sub-graphs, the graph construction manager 226 may calculate the expected automation level for future proposed sub-graphs during the current session.

The graph construction manager 226 may further estimate the expected automation level based on the automation level identified for the same a group of proposed sub-graphs (queries) proposed during one or more previous session of the concept map graph construction. Based on the identified matching events for the proposed sub-graphs during the previous session(s), the graph construction manager 226 may calculate the expected automation level for the proposed sub-graphs during the current session.

Additionally and/or alternatively, the graph construction manager 226 may estimate the expected automation level based on the match events ratio calculated for one or more concept map graphs similar to the concept map graph constructed during the current session. The similarity between the concept map graphs discussed (constructed) may be expressed by one or more characteristics of the concept map graphs, for example, a size (number of nodes), a complexity of relationships (number of edges), a domain of knowledge exhibited in the concept map graphs (e.g., science, philosophy, sport, etc.), and/or the like.

The reviewer 232 may set an automation threshold to define the maximum automation level the reviewer 232 allows for the graph construction manager 226 to respond automatically to the proposing user 234 with the stored feedback record associated with a matching stored sub-graph. In other words the reviewer 232 indicates that in the automation level exceeds a certain level (automation threshold), the reviewer 232 would like to assess the proposed sub-graph himself regardless of the fact that a stored feedback is available for the proposed sub-graph.

As shown at 404, which is a decision point, the graph construction manager 226 compares the estimated automation level to the automation threshold set by the reviewer 232. In case the estimated automation level does not exceed the automation threshold, the graph construction manager 226 proceeds to step 108 of the process 100 and retrieves the stored feedback record from the stored sub-graphs database 230. In case the estimated automation level exceeds the automation threshold, the graph construction manager 226 proceeds to step 112 of the process 100 and forwards the proposed sub-graph to the reviewer 232.

Figure 5:
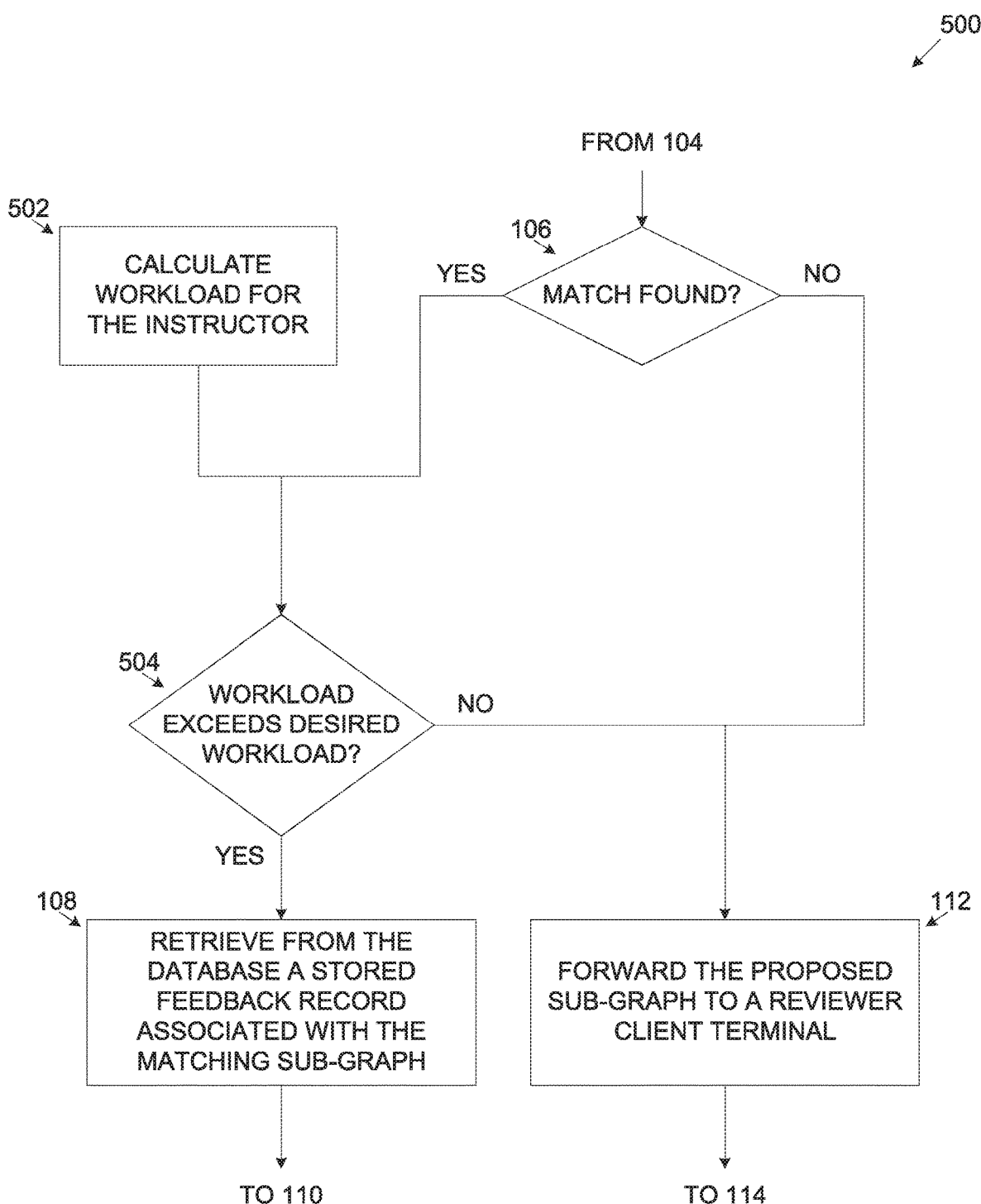
FIG. 5 is a flowchart of an exemplary process of assessing a sub-graph proposed for constructing a concept map graph with workload level adaptation, according to some embodiments of the present invention.

Reference is now made to FIG. 5, which is a flowchart of an exemplary process of assessing a sub-graph proposed for constructing a concept map graph with workload adaptation, according to some embodiments of the present invention. A process 400 which is an extension of a section of a process such as the process 100 executed in a system such as the system 200 begins after step 106 of the process 100.

As shown at 502, a graph construction manager such as the graph construction manager 226 estimates a workload for a reviewer such as the reviewer 232 during the current concept map graph construction session. The workload may be expressed as, for example, a number of proposed sub-graphs (queries) forwarded by the graph construction manager 226 to the reviewer 232 per time unit (a queries flow), for example, a minute, an hour and/or the like.

The graph construction manager 226 may derive the estimated workload from the estimated automation level for the current concept map graph construction session. Since the automation level may indicate the ratio of match events in which the graph construction manager 226 responds automatically with the stored feedback, the workload may represent the complementary ratio of no match requiring forwarding the proposed sub-graph to the reviewer 232 thus loading him.

The reviewer 232 may set a workload threshold to define the maximum workload the reviewer 232 would like to maintain. In other words, through the workload threshold, the reviewer 232 may indicate the maximum workload he allows which may translate to the maximum number of proposed sub-graphs the reviewer 232 would like to respond to, i.e., the maximum number of proposed sub-graphs the graph construction manager 226 forwards to the reviewer 232.

As shown at 504, which is a decision point, the graph construction manager 226 compares the estimated workload to the workload threshold set by the reviewer 232. In case the estimated workload exceeds the workload threshold, the graph construction manager 226 proceeds to step 108 of the process 100 and retrieves the stored feedback record from the stored sub-graphs database 230. In case the estimated workload does not exceed the workload threshold, the graph construction manager 226 proceeds to step 112 of the process 100 and forwards the proposed sub-graph to the reviewer 232.

Reference is made once again to FIG. 1.

As shown in 114, the graph construction manager 226 receives from the reviewer client terminal 202 a feedback record generated for the proposed sub-graph by the reviewer 232 using the GUI presented by the graph construction reviewer 222. The generated feedback record may be generated to indicate the assessment level, for example, correctness, relevance and/or applicability of the proposed sub-graph and may maintain the same structure, attributes and/or properties as the stored feedback records.

Optionally, the reviewer 232 using the GUI presented by the graph construction reviewer 222 assesses the partial subsets of the proposed sub-graph. For example, assuming the proposed sub-graph comprises two concept nodes, "oxygen" and "burning" and a directed edge (relationship link) designated "no required". The reviewer 232 may assess a partial subset of the proposed sub-graph and generate the feedback accordingly. For example, the reviewer 232 may indicate that the concept nodes oxygen" and "burning" are correct, however, the directed edge (relationship link) designated "no required" is incorrect and should rather be designated "required". The reviewer 232 may generate the feedback record to indicate the correctness of the nodes of the proposed sub-graph and the incorrectness of the edge of the proposed sub-graph.

Optionally, the reviewer 232 may apply, for example, through the graph construction reviewer 222 one or more semantic assessment tools, for example, the speech processing tool, the language processing tool and/or the like to analyze the proposed sub-graph. The semantic assessment tool(s) may identify one or more troponyms, synonyms, antonyms and/or the like to assist the reviewer 232 to more easily asses the proposed sub-graph.

Optionally, the graph construction manager 226 updates the stored sub-graphs database 230 with the feedback record generated by the reviewer 232 for the proposed sub-graph. In case no matching stored sub-graph is available for the proposed sub-graph, the graph construction manager 226 may store the proposed sub-graph in the stored sub-graphs database 230 and associate the proposed sub-graph with the feedback record generated by the reviewer 232. In case a matching stored sub-graph is available for the proposed sub-graph, the graph construction manager 226 may update and/or integrate the stored feedback record for the matching sub-graph with the feedback record generated by the reviewer 232.

Optionally, the graph construction manager 226 may further assign a weight to each feedback record and/or feedback entry generated by the reviewer 232 and updated in the stored sub-graphs database 230. The wright may be assigned according to one or more attributes of the reviewer 232, for example, a seniority, an experience, a rating of said reviewer and/or the like.

Optionally, the graph construction manager 226 generates and/or updates a rating record of the reviewer 232 to credit the reviewer 232 for generating the feedback record for the proposed sub-graph. This may allow, for example, rewarding the reviewer(s) 232 according to their effort for assessing the sub-graphs proposed by the users 234 and/or according to their contribution to expanding, amending and/or improving the stored sub-graph database 230. The graph construction manager 226 may credit the rated reviewer 232 according to one or more parameters, for example:

The number of other reviewers 232 who conducted concept map graph construction sessions using the concept map created and/or conceived by the rated reviewer 232.

The number of users 234 who used sub-graphs created and/or conceived by the rated reviewer 232.

The number of concept map graphs constructed based on the sub-graphs created and/or conceived by the rated reviewer 232

The number proposed sub-graphs the rated reviewer 232 assessed and/or generated feedback for.

The number of user 234 who received feedback records generated by the rated reviewer 232.

The number of concept map graphs that include stored feedback records generated by the rated reviewer 232.

Naturally, the reviewer 232 reviewing the proposed sub-graphs may be the same one who created and/or conceived the concept map. Additionally, the reviewer 232 reviewing the proposed sub-graphs may be the same one who created and/or conceived one or more of the stored sub-graphs. However, it is also possible, that the reviewer 232 reviewing the proposed sub-graphs is not the same person who created and/or conceived the concept map and/or the stored sub-graphs. The construction manager 226 may adjust and/or adapt the credits to the rated reviewer 232 accordingly.

Optionally, the graph construction manager 226 forwards the proposed sub-graph to one or more other users 234. i.e. transmits the proposed sub-graph to the graph construction client 224 executed by the user client terminals 204 used by one or more other users 234. This may be done in order to allow reviewing user(s) 234 to review and/or assess sub-graph(s) proposed by one or more other users 234 and generate and/or update the feedback record for the respective proposed sub-graph(s). Optionally, the graph construction manager 226 forwards the user feedback record generated by one or more of the users 234 to the reviewer client terminal(s) 202 to allow the reviewer 232 to validate the feedback generated by the reviewing user 234. In case the reviewer 232 validates (approves) the feedback generated by the reviewing user 234, the reviewer 232 may use the GUI presented by the graph construction reviewer 224 to send a validation message to the graph construction manager 226. The graph construction manager 226 may further update the stored sub-graphs database 230 with the feedback generated by the reviewing user 234 when a validation message for the user feedback record is received from the graph construction reviewer 224. In case no matching stored sub-graph is available for the proposed sub-graph, the graph construction manager 226 may store the proposed sub-graph in the stored sub-graphs database 230 and associate the proposed sub-graph with the feedback record generated by the reviewing user 234. In case a matching stored sub-graph is available for the proposed sub-graph, the graph construction manager 226 may update and/or integrate the stored feedback record for the matching sub-graph with the feedback entry generated by the reviewing user 234.

As shown in 116, the graph construction manager 226 responds (transmits) the generated feedback record to the graph construction client 224 executed by the user client terminal 204 of the proposing user 234 who proposed the proposed sub-graph. The response may be transmitted to the user client terminal 204 of the proposing user 234 as a message over the network 206. The graph construction client 224 may present the received feedback record to the proposing user 234 through the GUI. Optionally, the graph construction manager 226 may transmit the generated feedback record to one or more graph construction clients 224 of one or more of the other users 234.

After the graph construction manager 226 responds to the graph construction client 224 with the stored and/or generated feedback record, the process 100 may proceed to one or more optional steps 118, 120 and/or 122.

As shown in 118, which is a decision point, the graph construction manager 226 evaluates the stored and/or the generated feedback record. The graph construction manager 226 may analyze the feedback record (stored and/or generated feedback) to determine whether it is positive, i.e. whether the proposed sub-graph is correct, wrong and/or partially correct. Optionally, the graph construction reviewer 222 used by the reviewer(s) and/or the graph construction client 224 used by the proposing user 234 analyze the feedback record (stored and/or generated feedback) to determine whether it is positive.

As shown in 120, in case the graph construction manager 226 determines that the stored and/or the generated feedback record indicate a positive feedback, the graph construction manager 226 may update the constructed concept map graph to include the proposed sub-graph. For example, the graph construction manager 226 may instruct the graph construction reviewer(s) 222 used by the reviewer(s) and/or one or more of the graph construction clients 224 used by the users 234 to present the updated concept map graph and/or the alteration induced to the concept map graph by the accepted proposed sub-graph. The Optionally, in case the graph construction client 224 analyzes the stored and/or the generated feedback record for the proposed sub-graph and determines the feedback record(s) indicate the positive feedback, the graph construction client 224 may present the updated concept map graph and/or the alteration induced to the concept map graph by the accepted proposed sub-graph. Similarly, in case the graph construction reviewer 222 analyzes the stored and/or the generated feedback record for the proposed sub-graph and determines the feedback record(s) indicate the positive feedback, the graph construction reviewer 222 may present the updated concept map graph and/or the alteration induced to the concept map graph by the accepted proposed sub-graph.

Optionally, the reviewer 232 and/or the user 234 may manually instruct the graph construction reviewer 222 and/or the graph construction client 224 respectively to present the updated concept map graph and/or the alteration induced to the concept map graph by the accepted proposed sub-graph.

As shown in 122, in case the stored and/or the generated feedback record is negative (not positive), the graph construction manager 226, the graph construction reviewer 222 and/or the graph construction client 224 may take one or more actions. For example, the graph construction manager 226 may discard the proposed sub-graph thus not instructing the graph construction reviewer 222 and/or the graph construction client 224 to present the updated concept map graph and/or the alteration induced to the concept map graph by the accepted proposed sub-graph. In another example, the reviewer 232 using the graph construction reviewer 222 may indicate and/or instruct the proposing user 234 using the graph construction client 224 to propose another sub-graph updated according to the provided feedback record. In such case the process 100 may repeat from step 102.

The process 100 executed through the system 200 may be employed for a plurality of learning sessions employing the concept map graph construction.

One exemplary learning session may employ a 'Who is the last?' methodology intended for a group of users 234 learning together a certain topic. One or more reviewer(s) 232 may conduct a session for constructing a shared concept map graph related to the studied topic through a collaborative effort of the users 234. The goal of each of the users 234 is to add correct sub-graphs, for example, concept nodes (concepts) and edges (relationships) to the constructed concept map graph. Each user 234 may propose in his turn (which is optionally time limited), a sub-graph to the constructed concept map graph. Each proposed sub-graph may be scored through the assessment process 100, either automatically according to the stored feedback and/or by the reviewer(s) 232. A user whose proposed sub-graph is assessed as correct may be credited with the score awarded to his proposed sub-graph. Optionally, the proposed sub-graph found correct is applied and presented to the users 234, for example, through one or more user client terminals such as the user client terminal 204. A user 234 who does not submit a proposed sub-graph on his turn (optionally within the time limit) may lose his turn and may receive no score, for example, 0 points.

Another exemplary learning session may employ a 'Submarines' methodology intended for two users 234 and/or two groups of users 234 learning together the same topic. One or more reviewer(s) 232 may conduct a session for constructing a concept map graph related to the studied topic. The goal of each user 234 (or each group) is to add to the concept map graph as many sub-graphs as he can by proposing proposed sub-graph(s) where only proposed sub-graphs assessed as correct may be added to the concept map graph. A user 234 (or group) who contributes more sub-graphs for a certain concept may be credited with all the scores awarded to all sub-graphs relating to the certain concept including sub-graphs proposed by the other user 234. Each user 234 may be presented with only a partial presentation of the concept map graph comprising only the sub-graphs he proposed and were accepted and applied to the constructed concept map graph. In case there is one or more accepted sub-graphs that are shared between the two users 234, the shared sub-graph(s) may be marked accordingly. The propositions of the proposed sub-graphs are done in turns which may optionally be time limited.

Another exemplary learning session may employ a 'Find the title' methodology intended for a plurality of users 234 learning together the same topic. One or more reviewer(s) 232 may conduct a session for constructing a shared concept map graph related to the studied topic through a collaborative effort of the users 234. Each user 234 may submit in his turn a proposed sub-graph that is assessed for correctness. Every proposed sub-graph that is assessed as correct may be applied (added) to the constructed concept map graph. The goal of the users 234 is to discover the title of the concept map graph.

Another exemplary learning session may employ a 'Clean the map' methodology intended for one or two users 234 (or groups of users 234) learning together the same topic. One or more reviewer(s) 232 may conduct a session for clearing a concept map graph related to the studied topic. In case of a single user 234 (or single group), the goal of the users 234 is to clear a partial sub-graph of the concept map graph that automatically appears on a screen, for example, the screen of his user client terminal 204. For example, the partial sub-graph may include only concept nodes with no connecting edge(s). The user 234 needs to submit a proposed sub-graph comprising the edges missing from the presented partial sub-graph. In case the proposed sub-graph is correct, the presented sub-graph is removed from the screen. The session may continue until the user 234 clears the entire concept map graph. In case of two users 234 playing against each other, the goal of a first user 234 (or group) may be to populate the concept map graph while the goal of a second user 234 (or group) may be to clear the concept map as presented herein above. The first user 234 may create the (populate) the concept map graph by submitting proposed sub-graphs that may be applied to the concept map graph in case they are assessed as correct. The goal of the second user 234 is to clear the concept map graph faster than the second user 234 populating the concept map graph.

Some embodiments of the present invention are presented through examples. In particular a user interface (UI) is presented through screen captures of an exemplary graph construction reviewer such as the graph construction reviewer 222 and an exemplary graph construction client such as the graph construction client 224.

Reference is now made to FIG. 6A, FIG. 6B, FIG. 6C, FIG. 6D and FIG. 6E, which are screen captures of an exemplary graph construction reviewer application for use by a reviewer conducting a concept map graph construction session, according to some embodiments of the present invention. FIG. 6A, FIG. 6B, FIG. 6C, FIG. 6D and FIG. 6E are screen captures of an exemplary graph construction reviewer such as the graph construction reviewer 222 used by one or more reviewers such as the reviewer 232 during a concept map graph construction session.

Figure 6A:
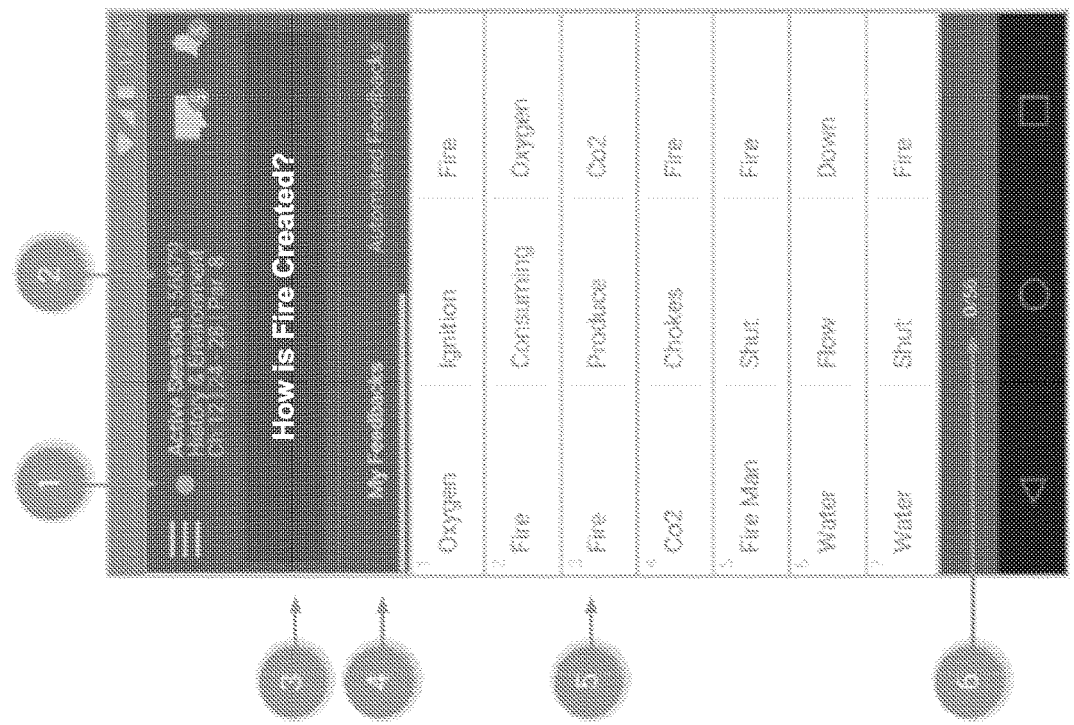
FIG. 6A, FIG. 6B, FIG. 6C, FIG. 6D and FIG. 6E are screen captures of an exemplary graph construction reviewer application for use by a reviewer conducting a concept map graph construction session, according to some embodiments of the present invention.

As shown in FIG. 6A, the graph construction reviewer 222 presents the reviewer 232 a proposed sub-graph submitted by a user such as the user 234 using a graph construction client such as the graph construction client 224. The graph construction reviewer 222 may present a plurality of session related information items, for example (the numbers correlate to the numbers in the screen capture):

(1) Session status, for example, session active, session inactive, session about to start and/or the like.
(2) Session resources, for example, session identification (ID), a resource database and/or the like.
(3) Session subject, for example, a topic, a question and/or the like.
(4) Feedback, for example, feedback record(s) generated by the reviewer 232, stored feedback records(s) available in a stored sub-graph database such as the stored sub-graph database 230 (automated feedback), feedback records generated by other reviewer(s) 232 during the session and/or the like.
(5) Proposed sub-graphs submitted by one or more users 234 and received from their graph construction client(s) 224.
(6) An indication of the number of checked proposed sub-graphs out of the total proposed sub-graphs received by the graph construction reviewer 222.

Figure 6C:
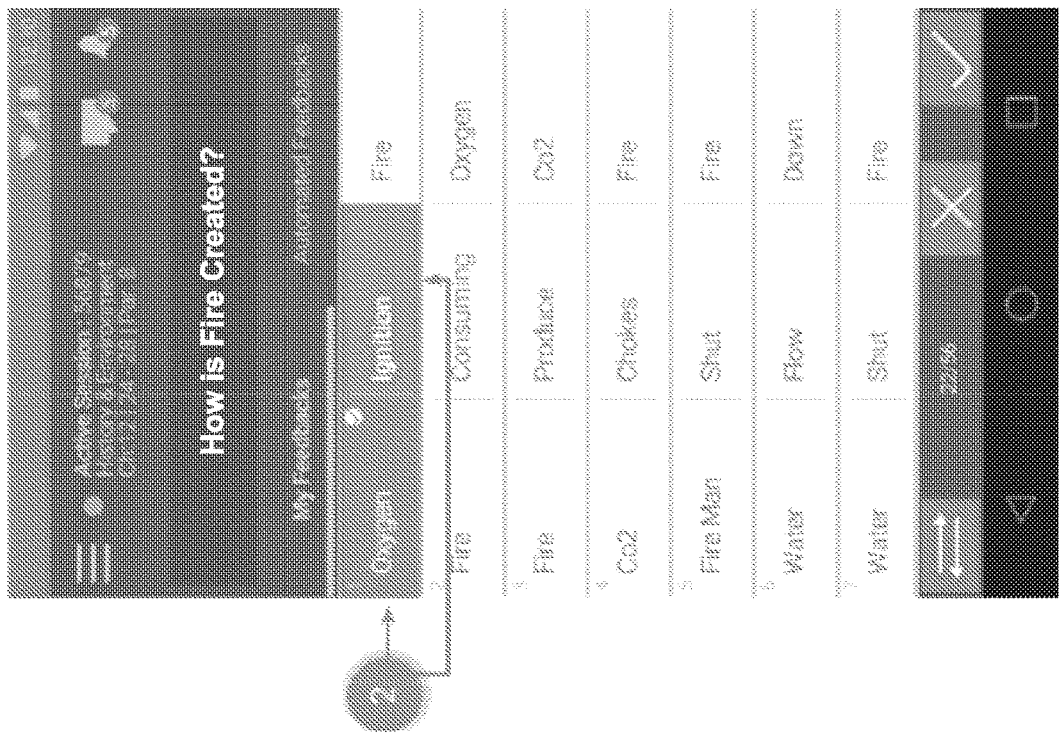
Figure 6B:

As shown in FIG. 6B, the reviewer 232 may select one of the presented proposed sub-graphs or part of a proposed sub-graph (1). Once one of the proposed sub-graphs (or part thereof) is selected, the graph construction reviewer 222 may present one or more review menus, for example, a reverse menu (A) to allow reversing the direction of the selected proposed sub-graph, a true/false menu (B) for marking the proposed sub-graph and/or part thereof as correct or incorrect and/or the like. The reviewer 232 may interact with one or more buttons of the review menu(s) to select a review action, for example, reverse the selected proposed sub-graph, mark the selected proposed sub-graph as correct/incorrect, mark a subset comprising one or more nodes and/or edges of the selected proposed sub-graph as correct/incorrect and/or the like. In response to a selection of one or more concept nodes and/or edges by the reviewer 232, the graph construction reviewer 222 may highlight the selected item(s), for example, with a selected color to indicate the active (selected) items.

As shown in FIG. 6C, assuming the reviewer 232 used the review menu(s) to mark the "Oxygen" node as correct and the "Ignition" relation edge as incorrect, the graph construction reviewer 222 may set an indication mark to reflect the selection (2) for example, √ symbol for a correct marking, x symbol for an incorrect marking and/or the like. The graph construction reviewer 222 may further highlight the marked concept node with a color, in particular, the color may indicate the type of the selection, for example, green for a correct node and/or edge, red for an incorrect node and/or edge, yellow for an irrelevant node and/or edge and/or the like.

Figure 6E:
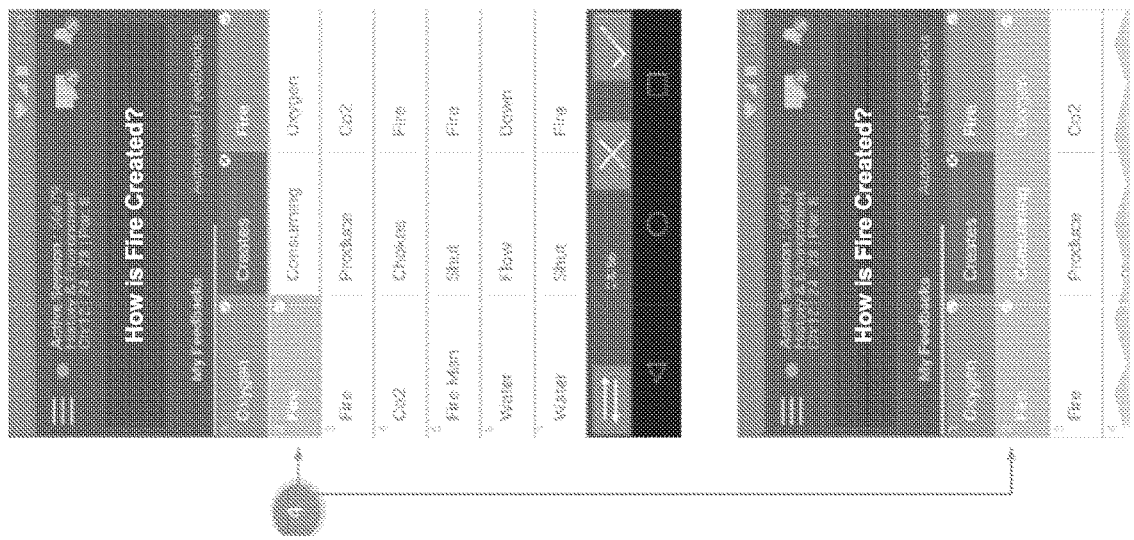
Figure 6D:
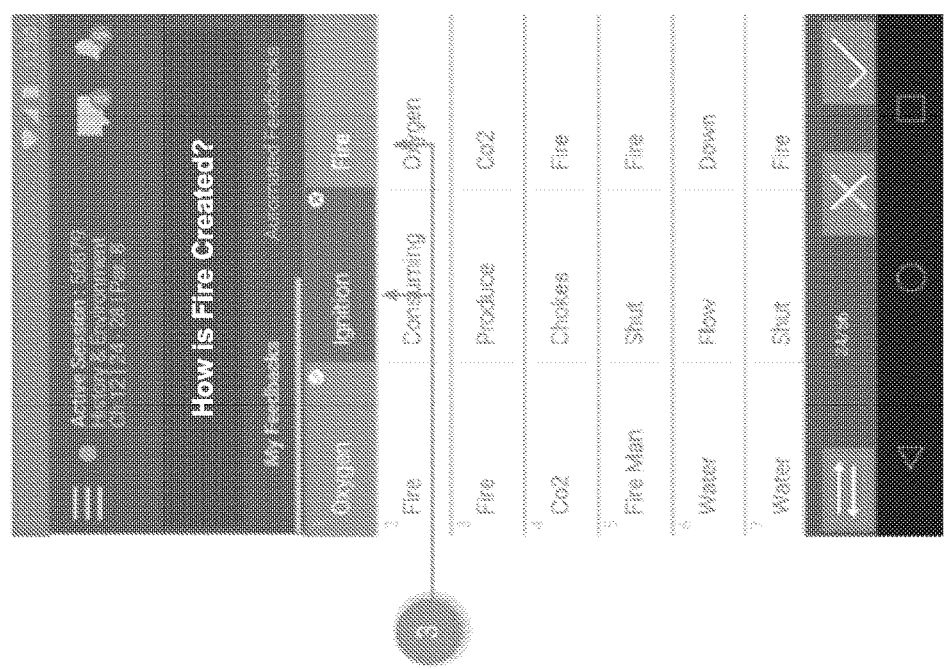

As shown in FIG. 6D and FIG. 6E, assuming the reviewer 232 used the review menu(s) to reverse the order of the selected proposed sub-graph, for example, reverse the order of the "Oxygen" node and the "Fire" node leaving the "Consuming" relation edge as correct, the graph construction reviewer 222 may reverse the selected proposed sub-graph and may further mark selected proposed sub-graph to indicate the reverse selection, for example, assigning a symbol, highlighting the reversed selected proposed sub-graph and/or the like.

Reference is now made to FIG. 7A, FIG. 7B, FIG. 7C, FIG. 7D, FIG. 7E, FIG. 7F, FIG. 7G, FIG. 7H, FIG. 7I, FIG. 7J, FIG. 7K and FIG. 7L, which are screen captures of an exemplary graph construction client application for use by a user participating in a concept map graph construction session, according to some embodiments of the present invention. FIG. 7A through FIG. 7L are screen captures of an exemplary graph construction client such as the graph construction client 224 used by one or more users such as the users 234 during a concept map graph construction session.

As shown in FIG. 7A, the graph construction client 224 may present an initial screen to the user 234 to allow the user 234 to select a first concept node (1) for creating a proposed sub-graph in order to construct the concept map graph. The graph construction client 224 may further present one or more toolbars, for example, an action toolbar (2) to allow the user 234 to manipulate one or more of the concept nodes and/or relationship edges in the sub-graph, for example, add, edit, remove and/or the like.

As shown in FIG. 7B, the graph construction client 224 may present another toolbar, for example, a search toolbar (3) to allow the user 234 to search for a concept node and/or an edge in the constructed concept map graph and/or in the created proposed sub-graph. Assuming, the user 234 selected to create a new concept node, for example, "Burn". In response to the selection of the user 234, the graph construction client 224 may create a new concept node "Burn" (4) and present it in the graph area. The graph construction client 224 may highlight selected item(s), to differentiate the active (selected) items.

As shown in FIG. 7C, once the user 234 selected (created) the concept node "Burn" the graph construction client 224 may present at the action menu (2) valid operations (6) the user 232 may choose in order to manipulate the selected node "Burn". The operations, may include, for example, add (9), edit (8), remove (7) and/or the like.

As shown in FIG. 7D, assuming the user 234 selected to add a new concept through the add action button (9), the graph construction client 224 may add a new concept node box (10). The graph construction client 224 may further add a connecting edge (A) to connect the newly added concept node to the first concept node "Burn". The graph construction client 224 may further present a virtual keyboard to allow the user 234 to insert text into the new concept node box.

As shown in FIG. 7E, after the user 234 defined the new concept node, for example, a "Fuel" node, the graph construction client 224 may allow the user 234 to edit, for example, insert text for the inserted edge using the virtual keyboard (1).

As shown in FIG. 7F, in case the user 234 does not select any of the items (nodes and/or edges) presented in the graph area, the graph construction client 224 may present only the add concept node action symbol (2).

As shown in FIG. 7G, assuming the user 234 used the add concept node action symbol to add a new "Energy" concept node, the graph construction client 224 may add a new concept node box "Energy" (4).

As shown in FIG. 7H, once the new concept node "Energy" is added to the graph, the graph construction client 224 may present additional actions in the action toolbar, for example, add new link (edge) (5).

As shown in FIG. 7I, assuming the user 234 used the add new link action symbol (1) to add a link in the sub-graph, the graph construction client 224 may present a text box (2) to allow the user 234 to insert a name of one or more of the concept nodes already presented in the graph area, for example, the "Burn" node and/or the "Fuel" node present in the graph area of the proposed sub-graph. Additionally and/or alternatively, the user 234 may select (mark using for example, a touch screen and/or a pointing device of a user client terminal such as the user client terminal 204) one or more of the nodes present in the graph area.

As shown in FIG. 7J, in case the user 234 selected to connect a link (edge) from the newly added concept node, for example, a "Energy" node to one or more of the nodes present in the graph area, for example, the "Fuel" node, the graph construction client 224 may by default set the link direction towards the node already present in the graph area, for example, "Fuel" node (3).

As shown in FIG. 7K, in case the user 234 selected to a link (edge) in the graph area, the graph construction client 224 may present in the action bar, one or more actions relevant to the link (4), for example, edit, remove, re-link (to another node), reverse direction and/or the like.

As shown in FIG. 7L, using the re-link action symbol, the user 234 may select to connect the "Energy" node to the "Burn" node (A). Using the reverse direction action symbol, the user 234 may select to reverse the direction of one or more links (edges), for example, the direction of the "Releases" edge to be directed from the "Burn" node towards the "Energy" node and reflected by the graph construction client 224 in the proposed sub-graph (5).

Reference is now made to FIG. 8A, FIG. 8B and FIG. 8C, which are screen captures of exemplary graph construction client and reviewer applications presenting feedback records for a proposed sub-graph received during a concept map graph construction session, according to some embodiments of the present invention. FIG. 8A and FIG. 8B are screen captures of an exemplary graph construction client such as the graph construction client 224 used by one or more users such as the users 234 during a concept map graph construction session. FIG. 8C is a screen captures of an exemplary graph construction reviewer such as the graph construction reviewer 222 used by one or more reviewers such as the reviewer 232 during the concept map graph construction session.

As shown in FIG. 8A, after receiving a feedback record from a graph construction manager such as the graph construction manager 226, the graph construction client 224 may present the user 232 with the feedback received for proposed sub-graph submitted by the user 232. The graph construction client 224 may use one or more indication for marking the feedback according to the feedback type, for example, √ symbol for a correct marking, x symbol for an incorrect marking and/or the like. The graph construction client 224 may further highlight the assessed items (nodes and edges) with a color, in particular, the color may indicate the type of the feedback, for example, green for a correct node and/or edge, red for an incorrect node and/or edge, yellow for an irrelevant node and/or edge and/or the like.

The graph construction client 224 may further present a more detailed feedback record, for example, a template feedback, a text feedback and/or the like in response to selection action made by the user 234, for example, selecting the feedback type indication of one or more of the nodes and/or edges. Optionally, the graph construction client 224 displays a show/hide feedback action symbol in the action bar (1) to allow the user 234 to show or hide the feedback markings and/or part thereof.

As shown in FIG. 8B, the graph construction client 224 may present to the user 234 the feedback record received from the graph construction manager 226 as a simple directed and/or undirected table, list and/or the like.

As shown in FIG. 8C, the graph construction reviewer 222 may present to the reviewer 232 the generated feedback record as a simple directed and/or undirected table, list and/or the like.

It is expected that during the life of a patent maturing from this application many relevant technologies and/or methodologies will be developed and the scope of the term client terminal is intended to include all such new technologies a priori.

As used herein the term "about" refers to ±10%.

The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

What is claimed is:

1. A computer implemented method of assessing sub-graphs proposed for constructing a concept map, comprising:
using at least one processor for executing a code for:
receiving a proposed sub-graph from at least one of a plurality of user client terminals used by a plurality of users, said proposed sub-graph for constructing a concept map graph comprises a plurality of concept nodes and at least one edge defining a conceptual relationship between said concept nodes;
searching a database comprising a plurality of stored sub-graphs to determine a match of said proposed sub-graph with one of said plurality of stored sub-graphs, each of said plurality of stored sub-graphs is associated with a stored feedback record;
in case of a match, selecting said stored feedback record associated with a matching stored sub-graph;
in case of no-match, forwarding said proposed sub-graph to a reviewer client terminal of at least one reviewer and receiving from said at least one reviewer client terminal a generated feedback record for said proposed sub-graph;
responding to said at least one user client terminal with said selected stored feedback record or said generated feedback record according to said match.

2. The computer implemented method of claim 1, further comprising said concept map is generated from a text by at least one text to map conversion tool.

3. The computer implemented method of claim 1, wherein at least one of said plurality of nodes is an existing concept node presented in said constructed concept map graph.

4. The computer implemented method of claim 1, further comprising said proposed sub-graph is generated from a text segment by at least one text to map conversion tool.

5. The computer implemented method of claim 1, further comprising analyzing said proposed sub-graph using at least one semantic analysis tool to estimate a match probability of said matching stored sub-graph which is semantically similar to said proposed sub-graph.

6. The computer implemented method of claim 1, further comprising aggregating a plurality of proposed sub-graphs such as said proposed sub-graph received from at least some of said plurality client terminals to update said concept map graph to include an aggregated sub-graph.

7. The computer implemented method of claim 1, further comprising updating said database to include said proposed sub-graph associated with said generated feedback record received from said at least one reviewer client terminal.

8. The computer implemented method of claim 1, further comprising forwarding said proposed sub-graph to said at least one reviewer client terminal in case of said match when a consensus value of said selected stored feedback record does not exceed a predefined feedback uniformity threshold, said consensus value is calculated by aggregating a plurality of feedback entries in the associated stored feedback record which are previously generated by a plurality of reviewers for said matching stored sub-graph.

9. The computer implemented method of claim 8, further comprising forwarding said proposed sub-graph to said at least one reviewer client terminal in case of said match when said consensus value of said stored feedback record exceeds a member of group consisting of:
said pre-defined feedback uniformity threshold and a number of said plurality of previous feedback entries does not exceeds a pre-defined feedback number threshold;
said pre-defined feedback uniformity for a partial set of said proposed sub-graph.

10. The computer implemented method of claim 8, further comprising assigning a weight to each feedback entry in each of said plurality of feedback records according to at least one attribute of said reviewer who generated said each feedback entry, said weight is used for said consensus value calculation, said at least one attribute is a member of a group consisting of: a seniority of said reviewer, an experience of said reviewer and a rating of said reviewer.

11. The computer implemented method of claim 1, further comprising setting an automation threshold to control forwarding said proposed sub-graph to said at least one reviewer client terminal in case of said match such that said proposed sub-graph is forwarded to said at least one reviewer when an estimated automation level exceeds said automation threshold, said estimated automation level represents an expected ratio of match events in which said matching stored sub-graph is found to match said proposed sub-graph.

12. The computer implemented method of claim 11, wherein said estimated automation level is estimated by calculating said match events for at least one of:
a group of recently proposed sub-graphs proposed during a current session of said concept map graph construction,
a group of proposed sub-graphs proposed during at least one previous session of said concept map graph construction, and
a group of proposed sub-graphs proposed for a at least one similar concept map graph.

13. The computer implemented method of claim 1, further comprising comparing an estimated workload of said at least one reviewer to a desired workload of said at least one reviewer to control forwarding said proposed sub-graph to said at least one reviewer client terminal in case of said match such that said proposed sub-graph is forwarded to said at least one reviewer client terminal when said desired workload exceeds said estimated workload.

14. The computer implemented method of claim 13, further comprising forwarding said proposed sub-graph to said at least one reviewer client terminal in case of said match when a stored feedback record associated with said matching stored sub-graph is incomplete.

15. The computer implemented method of claim 1, further comprising forwarding said proposed sub-graph to at least one other user client terminal and receiving from said at least one other user client terminal a user feedback record generated for said proposed sub-graph by at least one user using said at least one other user client terminal, said user feedback record is transferred to said at least one reviewer client terminal for validation.

16. The computer implemented method of claim 15, further comprising updating said database to include said user feedback record associated with said user feedback record in case a validation message for the user feedback record is received from said at least one reviewer client terminal.

17. The computer implemented method of claim 1, further comprising said feedback record is generated automatically by at least one semantic assessment tool analyzing said proposed sub-graph.

18. The computer implemented method of claim 1, further comprising updating a constructed concept map graph to include said proposed sub-graph when said feedback record indicates a positive feedback.

19. A system for assessing sub-graphs proposed for constructing a concept map, comprising:
  at least one processor adapted to execute a code, said code comprising:
  code instructions to receive a proposed sub-graph from at least one of a plurality of user client terminals used by a plurality of users, said proposed subgraph for constructing a concept map graph comprises a plurality of concept nodes and at least one edge defining a conceptual relationship between said concept nodes;
  code instructions to search a database comprising a plurality of stored subgraphs to determine a match of said proposed sub-graph with one of said plurality of stored sub-graphs, each of said plurality of stored sub-graphs is associated with a stored feedback record;
  code instructions to select, in case of a match, said stored feedback record associated with a matching stored sub-graph;
  code instructions to forward, in case of no-match, said proposed sub-graph to a reviewer client terminal of at least one reviewer and receive from said at least one reviewer client terminal a generated feedback record for said proposed subgraph; and
  code instructions to respond to said at least one user client terminal with said selected stored feedback record or said generated feedback record according to said match.

20. A computer program product for assessing sub-graphs proposed for constructing a concept map, comprising:
  a non-transitory computer readable storage medium;
  first program instructions for receiving a proposed sub-graph from at least one of a plurality of user client terminals used by a plurality of users said proposed sub-graph for constructing a concept map graph comprises a plurality of concept nodes and at least one edge defining a conceptual relationship between said concept nodes;
  second program instructions for searching a database comprising a plurality of stored sub-graphs to determine a match of said proposed sub-graph with one of said plurality of stored sub-graphs, each of said plurality of stored sub-graphs is associated with a stored feedback record;
  third program instructions for selecting, in case of a match, said stored feedback record associated with a matching stored sub-graph;
  fourth program instructions for forwarding, in case of no-match, said proposed sub-graph to a reviewer client terminal of at least one reviewer and receiving from said at least one reviewer client terminal a generated feedback record for said proposed sub-graph; and
  fifth program instructions for responding to said at least one user client terminal with said selected stored feedback record or said generated feedback record according to said match;
  wherein said first, second, third, fourth and fifth program instructions are executed by at least one processor from said non-transitory computer readable storage medium.

* * * * *